United States Patent
Ward et al.

(10) Patent No.: US 10,122,664 B2
(45) Date of Patent: Nov. 6, 2018

(54) WIRELESS ELECTRONIC DEVICE CONFIGURATION SYSTEM

(71) Applicant: Logical Concepts, Inc., Indianapolis, IN (US)

(72) Inventors: Thomas Owen Ward, Greenwood, IN (US); David Lee Brown, Franklin, IN (US)

(73) Assignee: Logical Concepts, Inc., Indianapolis, IN (US)

( * ) Notice: Subject to any disclaimer, the term of this patent is extended or adjusted under 35 U.S.C. 154(b) by 0 days.

(21) Appl. No.: 15/243,963

(22) Filed: Aug. 22, 2016

(65) Prior Publication Data

US 2016/0359785 A1 Dec. 8, 2016

Related U.S. Application Data

(63) Continuation of application No. 14/065,036, filed on Oct. 28, 2013, now Pat. No. 9,439,050.

(60) Provisional application No. 61/719,396, filed on Oct. 27, 2012.

(51) Int. Cl.
| | |
|---|---|
| H04M 3/00 | (2006.01) |
| H04L 12/58 | (2006.01) |
| H04W 4/14 | (2009.01) |
| H04W 4/12 | (2009.01) |
| H04W 4/50 | (2018.01) |
| H04L 12/24 | (2006.01) |
| H04W 88/06 | (2009.01) |

(52) U.S. Cl.
CPC .......... *H04L 51/18* (2013.01); *H04L 41/0886* (2013.01); *H04W 4/12* (2013.01); *H04W 4/14* (2013.01); *H04W 4/50* (2018.02); *H04W 88/06* (2013.01)

(58) Field of Classification Search
CPC ..... H04L 51/18; H04L 41/0886; H04L 41/08; H04W 4/001; H04W 4/12; H04W 4/14; H04W 88/06
See application file for complete search history.

(56) References Cited

U.S. PATENT DOCUMENTS

| | | | |
|---|---|---|---|
| 2005/0009511 A1* | 1/2005 | Bostrom | H04M 1/72533 455/419 |
| 2006/0082462 A1 | 4/2006 | Crook | |
| 2008/0233983 A1* | 9/2008 | Park | H04L 12/2818 455/466 |
| 2009/0292340 A1* | 11/2009 | Mass | A61N 1/37282 607/60 |
| 2012/0002810 A1* | 1/2012 | Imming | H04L 9/0656 380/247 |

(Continued)

*Primary Examiner* — Barry W Taylor
(74) *Attorney, Agent, or Firm* — Brinks Gilson & Lione

(57) ABSTRACT

A programmable electronic device includes a processor, a cellular transceiver module and a command interpreter module. The cellular transceiver module can be executable by the processor. The command interpreter module is in communication with the cellular transceiver module and is executable by the processor. The command interpreter module is configured to transmit and receive text messages via the cellular transceiver module. The command interpreter module is further configured to program and configure operation of the programmable electronic device from commands and content identified by the command interpreter module in the text messages. The text messages may be unstructured.

20 Claims, 21 Drawing Sheets

(56) References Cited

U.S. PATENT DOCUMENTS

| | | | | |
|---|---|---|---|---|
| 2012/0295567 A1* | 11/2012 | Tropper | .................. | H04W 4/14 455/404.1 |
| 2013/0027341 A1* | 1/2013 | Mastandrea | ............ | G06F 3/014 345/173 |
| 2013/0297078 A1* | 11/2013 | Kolavennu | ........ | G05D 23/1917 700/276 |

* cited by examiner

WIRELESS ELECTRONIC DEVICE CONFIGURATION SYSTEM

PRIORITY CLAIM

This application is a continuation of U.S. patent application Ser. No. 14/065,036, filed on Oct. 28, 2013, which claims the benefit of priority from U.S. Provisional Patent Application No. 61/719,396 filed on Oct. 27, 2012, both of which are incorporated by reference.

BACKGROUND OF THE INVENTION

1. Technical Field

This invention relates, in general, to electronic devices and, in particular, to a system for programming and configuring a programmable electronic device.

2. Related Art

There are many methods that exist today for programming and configuring programmable devices. A programmable device can be any device which is capable of executing software, or firmware, instructions, and by executing such instructions, producing a result. Today, these programmable devices are programmed and configured using sophisticated compliers and programming languages such as C, C+, C++, C#, Java, HTML, BASIC, FORTRAN, Ladder Logic, and many, many other pre-complied templates GUI's and HMI interfaces. These sophisticated software compliers and programming interfaces require the user to have a high knowledge of the software usage, formatting, syntax and configure their programming and settings using proprietary software and compilers. Additionally, these systems require the user to input the data, objects and commands in a rigid and structured format. For example, creating simple programming commands in C+ programming language require the user to format each command entry in a predetermined format, with every comma, space and letter being structured in a precise column (i.e. location). If not done correctly, the program will encounter a compilation error and will not operate until the syntax error is corrected.

Consequently, much of the human population is exempted from programming or configuring programmable devices as they may not have the necessary skills to master a certain programming language. Additional barriers exist such as financial hardship, lack of education and literally no access to programming software s or PCs. Although, to this day, much of the world's population does not have access to such luxuries, there is an enormous world population of cell phone users that enjoy low cost text messaging as a way to communicate. Accordingly, a need has arisen for systems and methods that utilize the text messaging feature of an ordinary cell phone to program and configure programmable devices, thus, enabling a larger part of the world population to be a success in the use and implementation of programmable devices, and overcoming financial, educational and socioeconomic barriers

SUMMARY

An electronic device configuration (EDC) system provides the capability to program and configure the operation of a programmable device, using a free form text based approach. In one example, programming and configuration may be in the form of text messages. The free form text based approach eliminates the need for structured syntax programming methods since no predetermined format or syntax is needed.

In one embodiment, a user using a personal cell phone, can enter simple predefined program variable names, commands, and objects followed by a variable configuration data or payload to form a configuration message. These configuration messages may be in the form of a text message that can be transmitted to an electronic device that the user desires to configure simply by identifying the device and pressing the "send" button on the phone. The resultant SMS text message is sent to the receiving programmable electronic device. Such messages may identify a desired electronic device using a unique identifier of the device. In an embodiment, the unique identifier may be a phone number associated with device that is entered into the text message recipient field. In other example embodiments, the unique identifier of the device may be an internet protocol (IP) address (such as an IPv6 address), a media access control (MAC) address, or any other form of unique identifier that enables transmission of a message to a desired device. Accordingly, although the term "phone" and "phone number" are used herein, it should be recognized that any other form of unique identifier is contemplated and may be interchangeably used.

The EDC system may be resident in the electronic device and receive the text message with a message receiver module. The EDC system may also include a command interpreter module which receives the text message from the message receiver module. The command interpreter module is configured to be "forgiving" so as to accept configuration messages in an unstructured format, or many different formats, while ignoring extra characters, spaces, incorrect spellings, etc., included in the incoming messages. The command interpreter module is "intelligent" so as to be capable of deciphering a message. The intelligence included in the command interpreter module allows a user to program or configure the remote device with predetermined commands in an unstructured format, or "casual method," thereby exempting the user from remembering the exact formatting syntax needed for other programming languages, and eliminating the need for a desktop computer, or custom programming software, to configure the programmable device.

Because the command interpreter module is capable of processing messages in an unstructured format, it is "forgiving" to the user by ignoring the need for a rigid syntax, and because the command interpreter module can operate as a text message interpreter of such unstructured messages, the programmable electronic device can be programmed by a wireless communication device which has speech-to-text capabilities. For example, using the iPhone 5™ from Apple™, Inc., equipped with the Siri™ speech-to-text capability, the user can merely speak verbal configuration commands into the phone and the resultant spoken messages within Siri are converted into a text message, which can be sent to the programmable electronic device. Upon receipt and processing of the text message, the programmable device can be reconfigured using the spoken settings just as though the message was typed on a keyboard and/or downloaded.

In one example, the electronic device that includes the EDC system may be included in a controller for a sump pump. In this example, text message commands may be provided to the controller to configure the operation and alarming capability of the sump pump. Thus, unstructured text commands may be provided wirelessly to the controller to, for example, identify recipients where alarms should be sent, such as by providing phone numbers, provide the content of the alarm messages, provide the alarm thresholds, and provide any other operational parameters to configure operation of the sump pump. In addition, configuration of the logic that enables the controller to generate and send text messages to designated recipients may be configured with text messages.

The EDC system may capture, calculate and/or store operational parameters related to the process, device or operation with which the EDC system is involved. In the example of use of the EDC system with equipment used in different applications, such as in a sump pump application in a home or business, the EDC system may include built-in software routines which allow calculation of daily and running totals of operational parameters, such as pump runtime, number of on/off cycles, and any other operational related information. These totals may be created by the EDC system through monitoring by the EDC system of various parameters and sensor outputs. In the example of a sump pump application, the current draw of the pump, such as via a current transducer may be captured and stored with the EDC system, and then the EDC system may correlate a large increase/decrease of current draw (i.e. from zero to a higher value or vise-versa) as evidence that the pump has either started or stopped. Using the EDC system, the pump start/stop events can be time/date stamped and then correlated to rainfall, such as via a connected rain sensor, or any other indication of rainfall provided to the EDC system, to determine the amount of increased runtime due to rainfall. This data can be made available to the user by the EDC system to allow the user to determine operational performance of the system that includes the EDC system. For example, in the sump pump example, the user may determine if gutter downspouts should be extended away from the structure within which the sump pump is operating, or other improvements in the drainage systems should be installed to eliminate large inflow increases to the sump pump, which could be prevented by improved yard drainage. The time and date stamps on pump runtime events, as well as many other values, can be obtained using a wireless radio transceiver included in the EDC system by retrieving the current date/time from a local cell tower in communication with the wireless radio transceiver. Wireless receipt of time and date information has many advantages over systems where a clock is manually set. For example, the clock included in the EDC system may be automatically reset for daylight savings time, and automatically track the correct time as the product moves from one time zone to the next, exempting the need for the user to manually reset clock time twice/year. In addition, where multiple EDC systems are deployed, use of a common master clock for all the EDC systems may allow synchronized time stamped data from each of the EDC systems to be correlated and otherwise used for monitoring and control.

The EDC system may also include calculation capability for the application in which the EDC system is deployed. Additional calculated features embedded within the EDC system for the example sump pump application include a pump GPM (gallons per minute) calculator based upon timed drawdown/refill of the well. Since the well size is a fixed value, and the associated pump on/off level setpoints are also fixed, then the user can enter the displaced gallons into the EDC system each time the pump starts/stops, via text message. Using the user provided information, the EDC system can calculate pump GPM based upon timed evacuation/refill of the well using volumetric calculations.

In addition, monitored and calculated variables inside the EDC system can be monitored by a deviation report module. If any one of the variables decrease substantially below or exceed their normal values by a predetermined threshold, such as two standard deviations, then an alert message for the respective variable can be sent to the user via text message indicating that a normal operating variable is "out of bounds". This early notification can give the user advanced warning of potential failures and/or provide predictive maintenance notifications for equipment operation. In the example of a sump pump application, such information may be used to solve a situation before an actual pump failure occurs.

The deviation report module may monitor any variable generated and/or provided to the EDC system. For example, in the sump pump application, pump amps, runtime, on/off cycles, and GPM may be monitored. Since the EDC system can keep track of variables such as the pump runtime, on/off cycles, and GPM, then different operational statistics can be calculated, such as a sump total daily flow, in gallons. Such information may be provided wirelessly to the user via text message, such as, to provide the user the ability to determine the inflow to the sump in the sump pump application, and make corrections as needed.

An embodiment of the EDC system, in the sump pump example, can also allow the user to enter, via text message, the name and contact phone number of a service contractor, such as the user's preferred plumber or repairman. This contact information can be automatically appended to each alert message sent to the user, or selected alert messages sent to the user.

The usefulness of this is apparent by way of the following example sump pump application—A homeowner is at work when a high water level alert is received via text message from the EDC system. In this example, the homeowner's workplace is 45 minutes from home. Since the user is 45 minutes from home, even if the user could leave the minute the alert arrived, a significant amount of flooding, could still occur. Further, even if the homeowner could make it home in 45 minutes, it is unlikely, in the event of a pump failure, that the user would have a replacement pump, or supplies to make the repair. This would greatly increase the possibility for additional water damage from flooding.

When the user receives the text message from the EDC system, which includes the contact information, such as a name and contact information of a preferred service provider, the user can quickly decide to call the contractor and tell the contractor to access the equipment, such as by giving the contractor the code to a garage door opener. A contractor, such as a plumber is better equipped to respond and repair the equipment, such as a failed pump, as many contractors have 24 hour repair service with parts-stocked service trucks. The contractor's contact information can be embedded in each alert message to eliminate the confusion, or panic, which often occurs during a crisis.

In some embodiments, the EDC system may be designed such that the cellular transceiver module is replaceable with either a GSM or CDMA radio transceiver, or any other type of wireless transceiver. This allows a single device to operate on different communication networks, such as on either a Verizon™ or ATT™ cellular network, should a user find that one, or the other, had poor service reception. The swap from one service, to the other, can occur by replacing only the radio transceiver module in the EDC system. In some embodiments, the EDC system can automatically self-identify that the radio transceiver has been changed, and select corresponding executable communication related instructions, or communication software in the EDC system to enable communication using the respective radio transceiver. Accordingly, the EDC system may selectively switch between different radio transceiver software, allowing the user to continue using his device on another carrier's network.

In some embodiments, the EDC system may also include a multi-function user interface. In one example, the user interface may include a push button providing multiple functions. An example of a multi-function push button is a push-to-test and hold-to-configure push button. The first aspect of the example push button may occur when the user pushes this button, the EDC system can respond by performing a self-diagnostic, and sending an "all OK" message to the user via a text message, indicating that the device is functioning properly. The second aspect of the example multi-function push button is a hold-to-configure capability. When the user holds down the multi-function button for a predetermined time, such as 3 seconds, the EDC system may enter a "programming mode" that is different from an "operation mode." In an example, while in the programming mode, the EDC system may allow configuration text messages to be received by the unit to configure its operation, whereas in the operation mode, no such configuration text messages will be allowed to configure operation. Accordingly, when in the operation mode (not in the programming mode), configuration text messages may be ignored. In other example embodiments, entry into the programming mode by the EDC system may be based on entry of a password, comparison to user profile information, or any other predetermined triggering event that can operate as a security function to avoid inadvertent or malicious programming activity of the EDC system.

The usefulness of this feature becomes apparent when one thinks about the security risks of a device which can accept text messages, sent from any mobile device. A child using a mobile device could disable the EDC system, by spamming the EDC system with messages which corrupt the original user settings. This situation is eliminated as the EDC system can be configured to only accept commands if the button is physically depressed. Once released from the programming mode, the EDC system can be configured to no longer accept configuration text commands from any source.

Alternatively, or in addition, as a security feature, validation of received messages may use an identity of a sender of a message. This form of validation may be used to validate, for example, commands and reject spam commands by only accepting messages from identifiers, such as phone numbers, that are configured in the device. Accordingly, storage of an authorized user identity, such as a phone number, may be used to enable the device to perform such a security feature. For example, to make initial configuration easier and exempt the need to enter a configuration mode, the device can accept messages including commands from any phone number until at least one authorized user identity, such as a phone number, has been stored. Once a first authorized user identity, such as a first phone number is stored in the unit, all configuration related commands must be sent from phone numbers programmed in the unit, or the unit must be in configuration mode, in order to be processed. Although phone numbers are described herein as an identifier of a sender of messages, other identifiers, such as an internet protocol (IP) address, a MAC address or any other unique identifier may be similarly used.

In some examples, the EDC system may be included in group management system in which a number of similar systems are managed as a group by a group manager using text message notification. For example, management features of the EDC system, used in the sump pump example, may include capabilities that allow a manufacturer of the EDC system or an EDC system manager the ability to extract one or more parameters from a number of different EDC systems using a text message command in the form of a group message. Example extracted parameters may include user programmed phone numbers that are extracted from the EDC system remotely by issuing a secure text message command. In this example, the phone number information can be stored and used by the manufacturer's database and a notification server system to alert users in the group that their subscription cellular service is expiring and needs to be renewed. In another example, a contractor, such as a plumber, may provide maintenance reminders to users of a group of systems, such as sump pump systems. In other examples, any other form of group management may be administered in this way.

This group message method of user notification can be superior to many other existing "billing" and notification methods, in that it exempts the manufacturer or group manager from preparing and delivering printed materials, such as mailing printed bills, and allows the manufacturer or group manager to notify users who do not submit warranty information, change their address, change their email address, etc. In the example where users forget to register their warranty, or make a mistake in registering address information, the text message notification functionality of the EDC system, can extract information such as user phone numbers from the individual EDC systems, in real time, using a group message, which gives the manufacturer an additional low cost way to remind users to renew their service by, for example, visiting a website. Alternatively, where it is desirable to maintain the confidentiality of user's contact information, such as phone numbers, the group message can be provided to the individual EDC systems, which can then forward, or otherwise generate the text message and transmit the text message to their respective identified users. In addition to a push function to transmit text messages, the group messaging may also be used to receive extracted similar system specific information from a number of EDC systems, as previously discussed. In addition to pulling extracted operational parameters, such as flow rates, and user contact information, such as phone numbers, other information, such as configuration information, installation dates, maintenance dates, wireless service renewal dates, software versions, or any other information may be requested using a group message. In response to such a pull group message, each of the EDC systems may individually transmit a different text message response to the requestor that includes the system specific requested information.

In one example, a programmable electronic device may use text messaging received from a mobile device to program and configure itself. During operation, the user can send unstructured text message configuration commands to the programmable electronic device, from their cellphone, such as "phone1 3171112222" and this sets the alarm callout phone number in a predetermined memory location, such as slot one of the memory of the programmable electronic device. What is significant about this is that the user can configure the unit without using a programming language or special tool, and a command interpreter module included in the programmable electronic device is able to interpret variations in content among different messages. In other words, the EDC system may be "forgiving" by being capable of processing unstructured messages or messages with unstructured content. As described herein, unstructured messages or messages with unstructured content are defined as messages that can have content in almost any format so long as there are character locations in the content of the message that have information corresponding to the command included in the message. Thus, for example, if an extra space or wrong character is inserted into character locations of the unstructured content of the message, the programmable electronic device can still interpret the message, execute and store to memory, and then confirm back to the user, via text message that it was correctly executed.

Because relatively simple word messages can be used to configure the programmable electronic device via messages, mobile devices which have speech command ability can configure and program the programmable electronic device 100% via voice command, and no configuration has to be typed on a keypad of any type. In an embodiment, in addition to the messages being used for programming and configuration, the programmable electronic device can also include communication capability to use a first protocol with a small payload that minimizes wireless airtime by communication on a first communication channel over a network, such as a wireless voice or SMS channel, and a second protocol with a larger payload to communicate/configure data in the programmable electronic device by communication on a second communication channel, such a data channel, over a network.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention.

DETAILED DESCRIPTION OF THE PREFERRED EMBODIMENTS

Figure 1:
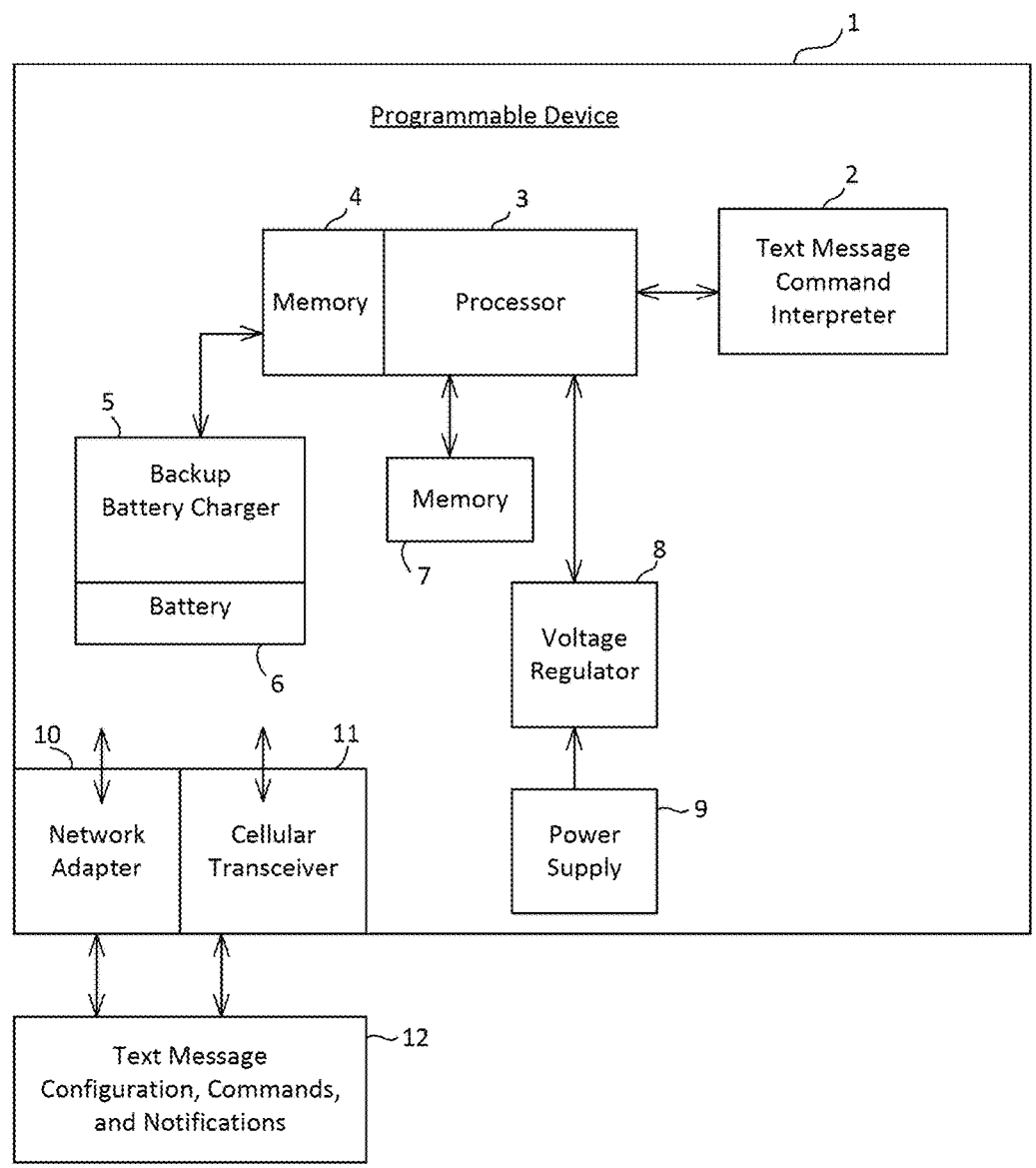
FIG. 1 is a block diagram of an example programmable electronic device that includes the EDC system.

While the making and using of various embodiments of the present invention are discussed in detail below, it should be appreciated that the present invention provides many applicable inventive concepts which can be embodied in a wide variety of specific contexts. The specific embodiments discussed herein are merely illustrative of specific ways to make and use the invention, and do not delimit the scope of the present invention FIG. 1 is one embodiment of a programmable electronic device that is configured to include an EDC system for receiving and interpreting text message configuration and programming statements sent from a computing device, such as a mobile communication device, such as a cell phone, or network connection and then programming/reprogramming or configuring/reconfiguring the operation of the a programmable device. As used herein, the term mobile communication device is defined to include mobile telephones, smart phones, tablets, computers, or any other device capable of communication of data through a network that includes communication wirelessly to an EDC system.

Referring to FIG. 1, a programmable device 1 may include a processor 3, such as a primary microprocessor or microcontroller in communication with either, or both, a network adapter module 10 and a cellular transceiver module 11. Text based information 12, such as a text message, may be sent and received to/from the network adapter module 10 and/or the cellular transceiver module 11 and/or the microprocessor 3, and may be interpreted by the command interpreter module 2. Each module described herein, such as the command interpreter module 2, the network adapter module 10, and the cellular transceiver module 11 is hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by a processor can also refer to logic based processing by the module that is initiated directly or indirectly by a processor to complete a process or obtain a result. Alternatively or in addition, each module can include memory hardware, such as at least a portion of a memory, for example, that includes instructions executable with a processor to implement one or more of the features of the module. When any one of the modules includes instructions stored in memory and executable with the processor, the module may or may not include the processor. In some examples, each module may include only memory storing instructions executable with a processor to implement the features of the corresponding module without the module including any other hardware. Because each module includes at least some hardware, even when the included hardware includes software, each module may be interchangeably referred to as a hardware module, such as the command interpreter hardware module 2.

In one embodiment, a primary form of communication is from the processor 3 to/from the network adapter 10, and a secondary form of communication is from the processor 3 to/from the cellular transceiver 11. Thus, in this example embodiment, when the connection of the network adapter 10 to the external world such as via the Internet is disabled or becomes inoperative, the processor 3 may communicate data to/from the cellular transceiver 11. This scenario takes advantage of an existing network, for which service is already likely being paid for by the user, and may use the cellular, metered, paid-for service if the primary network service becomes unavailable; thus limiting cellular data exchange to the minimum, and minimizing cellular airtime costs. In other example embodiments, the primary form of communication may be wireless communication via the cellular transceiver 11, and the secondary form of communication may be a wired network via the network adaptor 10.

The EDC system may also include memory. The memory may be on-board internal memory 4 of the processor 3 and/or external memory 7 that is accessible by the processor 3. Configuration and programming commands received and processed by the command interpreter 2 can be stored in the memory 4 and/or 7 and can be used to alter the operation of the programmable device as decided by the user. The memory 4, 7 may also include buffers for temporary data storage. The memory 4, 7 may be or include a main memory, a static memory, or a dynamic memory. The memory 4, 7 may include any non-transitory memory device. The memory 4, 7 may also include computer readable storage media such as various types of volatile and non-volatile storage media including random access memory, read-only memory, programmable read-only memory, electrically programmable read-only memory, electrically erasable read-only memory, flash memory, a magnetic tape or disk, optical media and the like. Also, the memory may include a non-transitory tangible medium upon which software may be stored. The software may be electronically stored as an image or in another format, such as through an optical scan, then compiled, or interpreted or otherwise processed or executed. In an example, the memory 4, 7 may include a cache or random access memory for the processor 3. In alternative examples, the memory 4, 7 may be separate from the processor 3, such as a cache memory of a processor, the system memory, or other memory. The memory 3, 7 may be or include an external storage device or database for storing data. Examples include flash memory, a hard drive, compact disc (CD), digital video disc (DVD), memory card, memory stick, floppy disc, universal serial bus (USB) memory device, or any other device operative to store data. The processor 3 and the memory 4, 7 may also include a computer-readable storage medium with instructions or software. The memory 4, 7 may be operable to store instructions executable by the processor 3. The functions, acts or tasks illustrated in the figures and/or described herein may be performed by the programmed processor 3 executing instructions stored in the memory 4, 7. The functions, acts or tasks may be independent of the particular type of instructions set, storage media, processor or processing strategy and may be performed by software, hardware, integrated circuits, firmware, microcode and the like, operating alone or in combination, as previously discussed. Likewise, processing strategies may include multiprocessing, multitasking, parallel processing and the like.

The programmable device 1 may include an energy management module, such as a backup battery charging circuit 5 and on-board back-up battery 6 to allow the programmable device to continue operating sending and receiving text messages in the event of an primary power failure as detected by an on-board power supply module 9 and voltage regulator module 8. The EDC system may be configured to perform functions specified with text message based configurations upon loss of power. For example, when the on-board power supply module 9 detects the loss of primary power, a text message notification can be sent to a programmable number of user's, via text message. The message notifications may advise of the power loss and providing specific additional information programmed via text message, such as possible danger to surrounding equipment which relies on the power for operation. For example, a basement sump pump that loses AC power is prone to failure even if the sump pump is equipped with backup AC power loss capabilities, and resultant water can back-up into the basement causing water damage to furniture and equipment.

Figure 2:
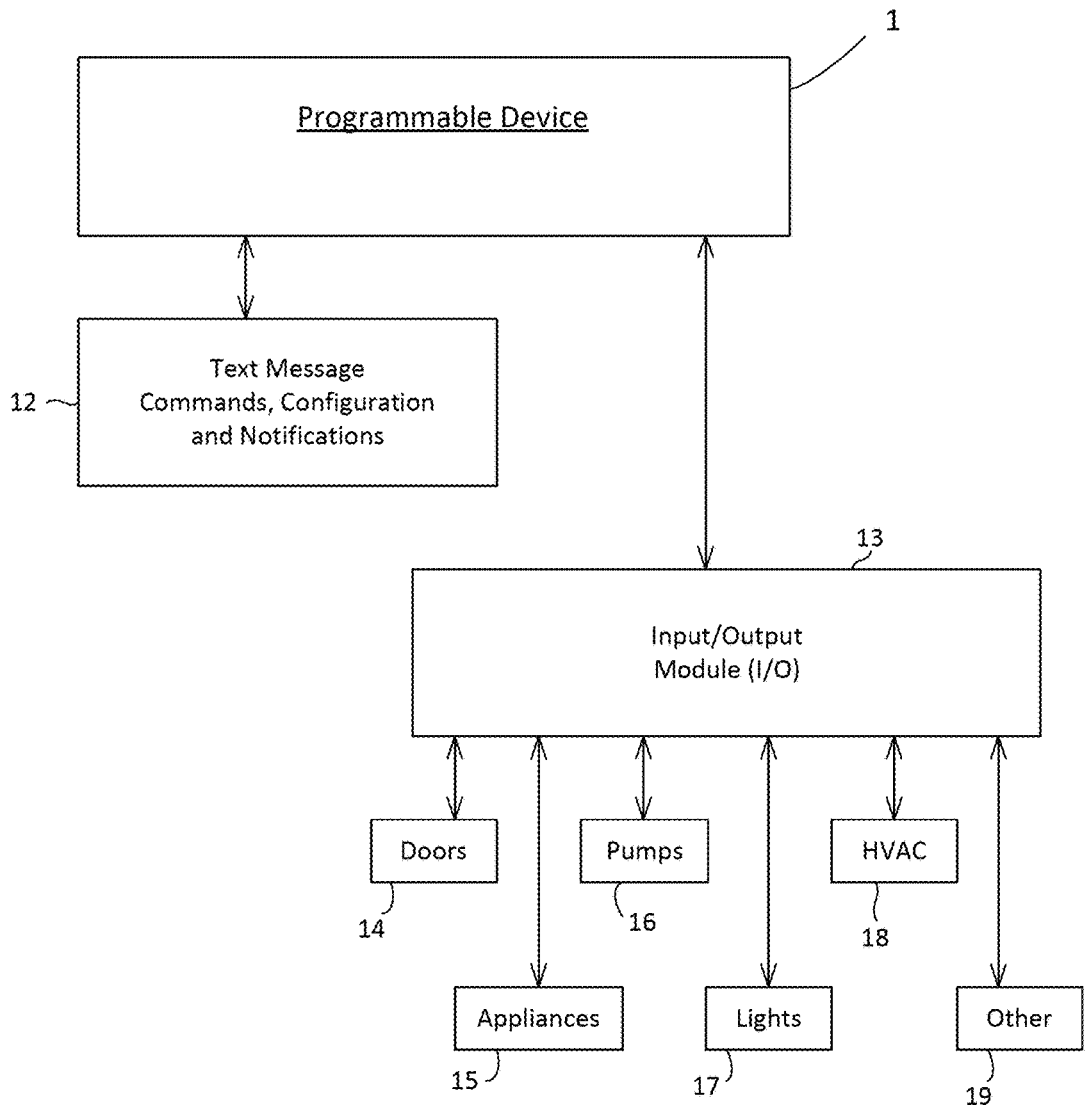
FIG. 2 is a block diagram of an embodiment of the EDC system that includes an input/output module.

FIG. 2 depicts another example programmable device similar to that shown in FIG. 1, however, in this example embodiment the programmable device is in communication with a field input/output I/O module 13. The field I/O module 13 may perform signal conversion, such as converting low voltage electrical signals from the processor 3 to higher voltage and current signals suitable for controlling and measuring any number of different devices external to the EDC system and/or the electronic device. In addition, the I/O module 13 may perform communication with different protocols, such as RS232, BlueTooth™, RS422, Firewire™, or any other communication protocol. Based on information provided via the field input/output I/O module 13, the processor may produce a function or action from the field input/output module 13 based upon the received message. Example external devices include but are not limited to doors 14, appliances 15, pumps 16, lights 17, heating and ventilating equipment HVAC 18 and/or any other devices 19 capable of receiving and transmitting control and data signals.

The programmable device 1 has the ability to interface with any number of devices, through the I/O module 13 and/or the network adapter 10, including other programmable electronic devices. Thus, the electronic device 1 may leverage the EDC system included therein as a proxy to communicate with other devices via the I/O module 13, the cellular transceiver module 11 and/or the network adapter 10. In one example, text messages may be received by the programmable device 1 that identify another external device as the destination of the message. The programmable device 1 may use the command interpreter module 2 in performing conversion of the text message to an appropriate protocol for the identified external device and communicate the message in the proper format to control, configure or program the external device. For example, the content of the text message may be extracted and used to generate the converted message. Thus, the converted message may include one or more commands executable by the external device and/or data in a format compatible with the external device. The converted message may be communicated, for example, via the I/O module 13. Alternatively, or in addition, an external device may provide information to the programmable device 1 that may be converted by the EDC system of the programmable device to a text message for transmission to a user. The information may be provided to the EDC system via the I/O module 13. Thus, the programmable device 1 may act as a programming and configuration engine for itself, and any other programmable device, or electronic device in communication with the programmable device 1.

Figure 3:
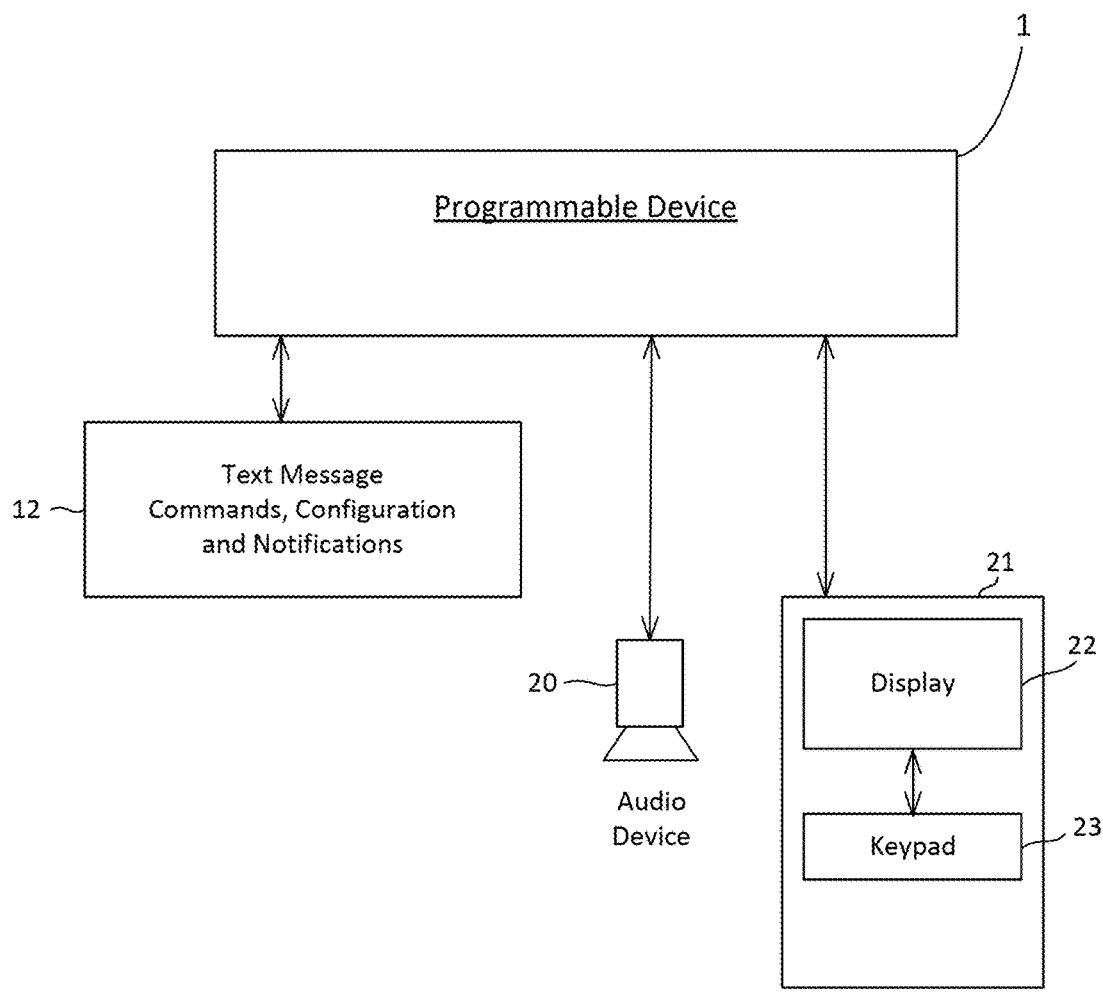
FIG. 3 is a block diagram of an embodiment of the EDC system illustrating the capability to produce a function or action on a local display and/or audio device based upon the received message.

FIG. 3 is another example embodiment of a programmable device 1 in communication with a human-machine interface 21 such as a device having a user interface. In an example, the user interface may include a display 22, such as a liquid crystal display LCD, and a local keypad 23. In other examples, a touch screen, pointing device, indicators, sliders, switches, buttons, or any other mechanism allowing a user to communicate with the programmable device may be used. In addition, voice commands, gesturing, and or any other form of communication between a user and the programmable device 1 may be enabled by the functionality of the user interface. In an example, the programmable device 1 can configure messages and data to be displayed on the display 22 as configured by text message commands 12, or enunciate messages and/or sounds via an audio device such as a local loudspeaker or piezo buzzer 20.

Figure 4:
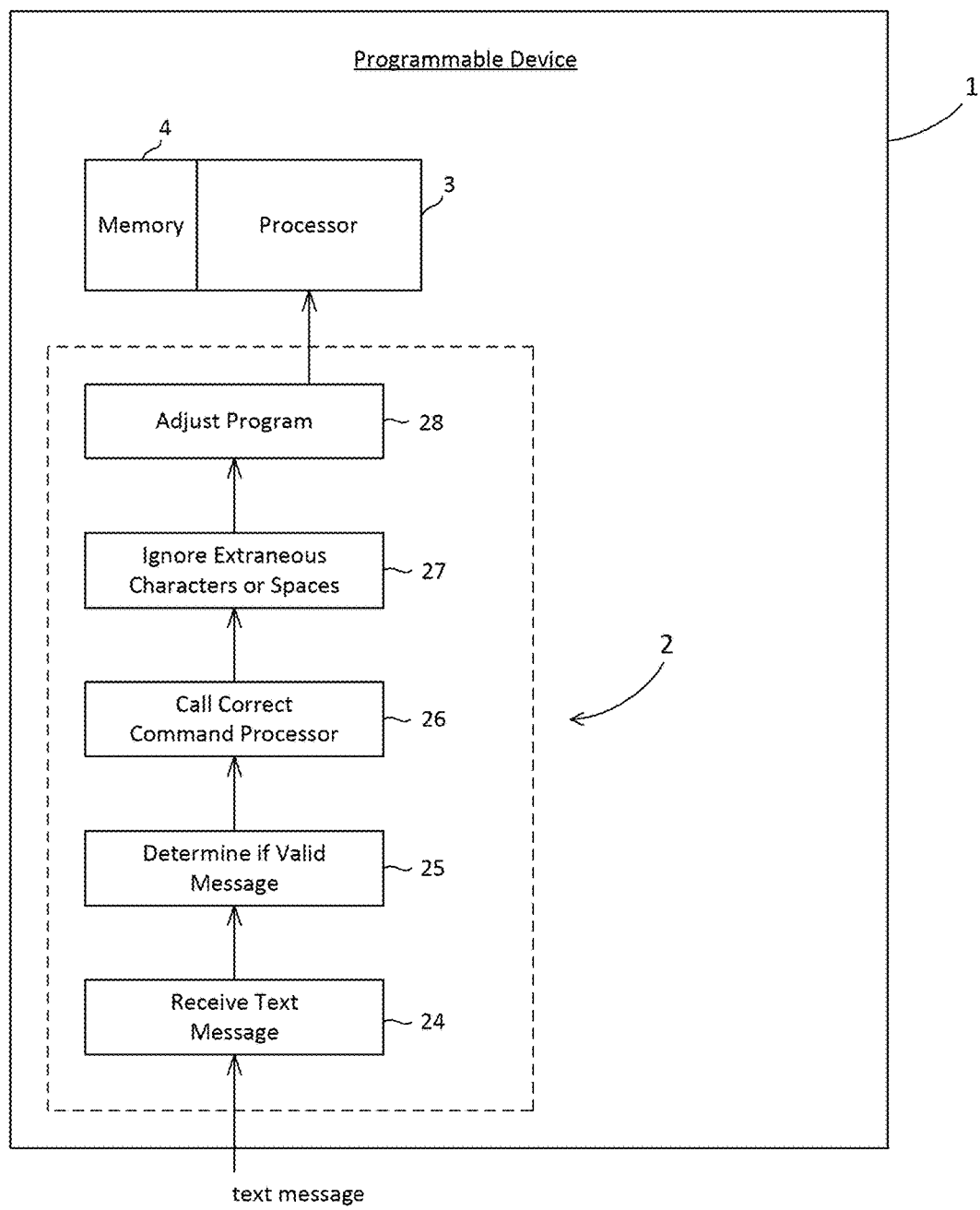
FIG. 4 is a block diagram of an embodiment of the EDC system illustrating programming/reprogramming or configuring/reconfiguring the operation of a device based upon the received message.

FIG. 4 is an example embodiment of the programmable device 1 that includes an EDC system and provides an operational flow diagram of the functionality controlled by the processor 3 upon receipt of a text message command at block 24 into the text message command interpreter module 2. The command interpreter module 2 may be used by the processor 3 to determine if a valid message has been received at block 25.

Figure 5:
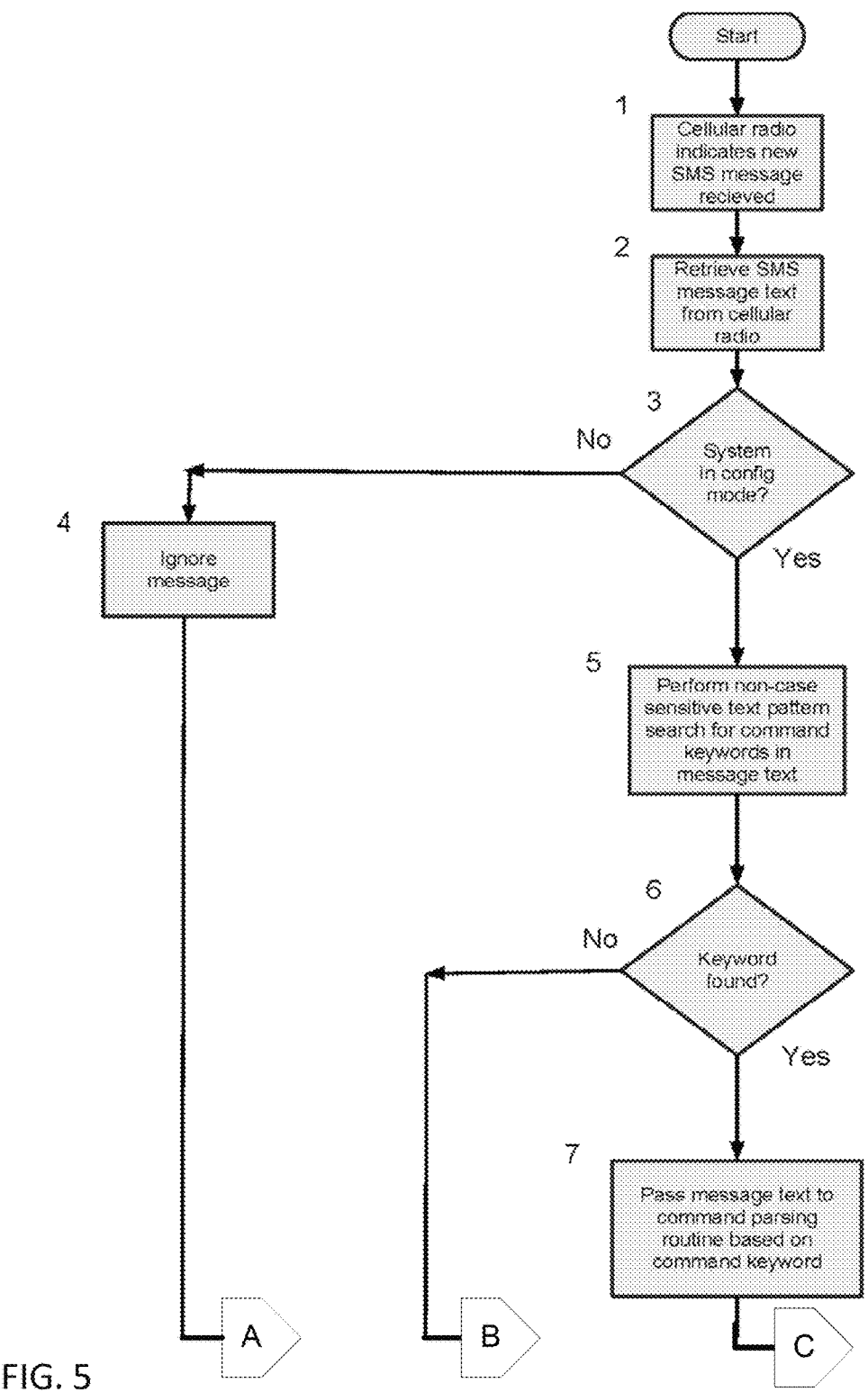
FIG. 5 is an operational flow diagram of an example message validation process.

FIG. 5 is an operational flow diagram of an example message validation process. At block 1, the cellular transceiver may indicate receipt of a message. In some embodiments, the cellular transceiver can indicate a received message, such as an SMS message, by toggling an output pin. The processor can monitor this pin for toggles. When the processor detects that the pin has been toggled, the processor can begin to retrieve the message. In other examples, any other mechanism may be used to trigger the processor to retrieve and validate an incoming message.

At block 2, the processor may retrieve the message from the cellular transceiver. In some embodiments, the processor can retrieve received messages from the cellular transceiver by, for example, issuing ASCII commands via a universal asynchronous receiver/transmitter (UART). When the commands are executed, the cellular transceiver sends the message text to the processor. The processor stores the message text in memory, such as random access memory (RAM), for processing.

At block 3, in connection with storage of the message, the processor can determine if the EDC system is in configuration mode, as previously discussed. If the EDC system is not in configuration mode, the message is ignored at block 4, and the processor does not process the message in any way. If, on the other hand, the system is in configuration mode, further processing of the message takes place. Further processing of the message may include the processor beginning a non-case sensitive text search for keywords that represent commands within the received message text at block 5. The processor can determine if the message includes predetermined stored keywords (or commands) in the message text at block 6, such as: phone, name, contractor, contact, settings, gallons, history and status, or any other predetermined keywords.

Figure 6:
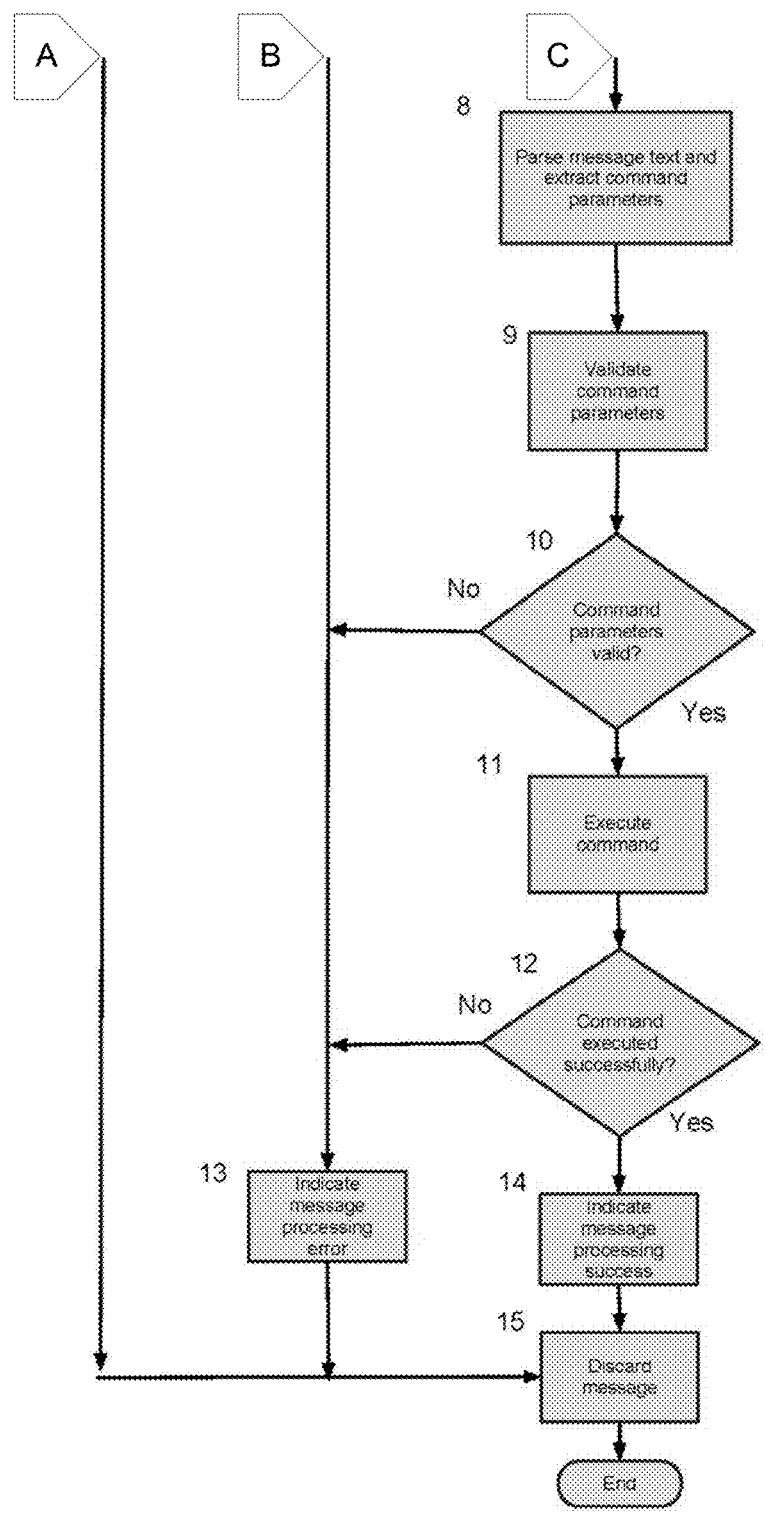
FIG. 6 is a second portion of the operational flow diagram of FIG. 5.

Referring to FIG. 6, if no keyword is found in the message text, an error is indicated at block 13. Referring again to FIG. 5, if a keyword is found in the message text, the message is further processed based on the identified keyword at block 7. Referring again to FIG. 6, at block 8, the message text is parsed to extract command parameters. Each command may have a corresponding parsing routine that is called by the processor based on the identified keyword. Alternatively, at least a portion of at least some of the parsing routines may be shared among different keywords. The message text may be passed into the parsing routine by the processor when the parsing routine is called. The command parsing routine can parse the content of the message text to extract command parameters, or identifiers representative of command parameters that may be specified by the user. Once the command parameters in the content of the message are extracted, the command parameters may be validated by the processor at block 9. In an example, the processor is capable of checking for a particular length, numeric only values, alpha only values, and/or alpha numeric values. If the command parameters are not valid, an error is indicated. If the command parameters are valid, further processing of the message takes place.

If the command parameters in the content of the message are determined by the processor to be valid based on the corresponding command included in the message at block 10, then the command is executed using the command parameters, if applicable (some commands may not have parameters) at block 11. At block 12, it is determined if the command executed successfully. If the command does not execute successfully, at block 13 an error can be indicated by the processor. If the command is successful, successful processing of the message can be indicated at block 14. With any error indication, the error can be indicated to a different subsystem which notifies the user in some way that an error occurred, or the user can be notified directly. Successful processing can similarly be indicated to a different subsystem which notifies the user in some way that a message was processed, or the user can be notified directly. At block 15, in response to the message being ignored at block 4, following indication of a message processing error at block 13, or following indication that the message was successfully processed, the incoming message can be discarded at block 15, by, for example, removal of the message from memory, such as RAM, by the processor.

Referring again to FIG. 4, if the processor determines that a valid message has been received, the message data can be passed to block 26, in which a correct command processor routine is determined and controlled by the processor. The processor can intelligently interpret commands even if the message contains extra spaces or extraneous delimiting characters at block 27, thereby exempting the user from inputting data in an exacting format.

Figure 8:
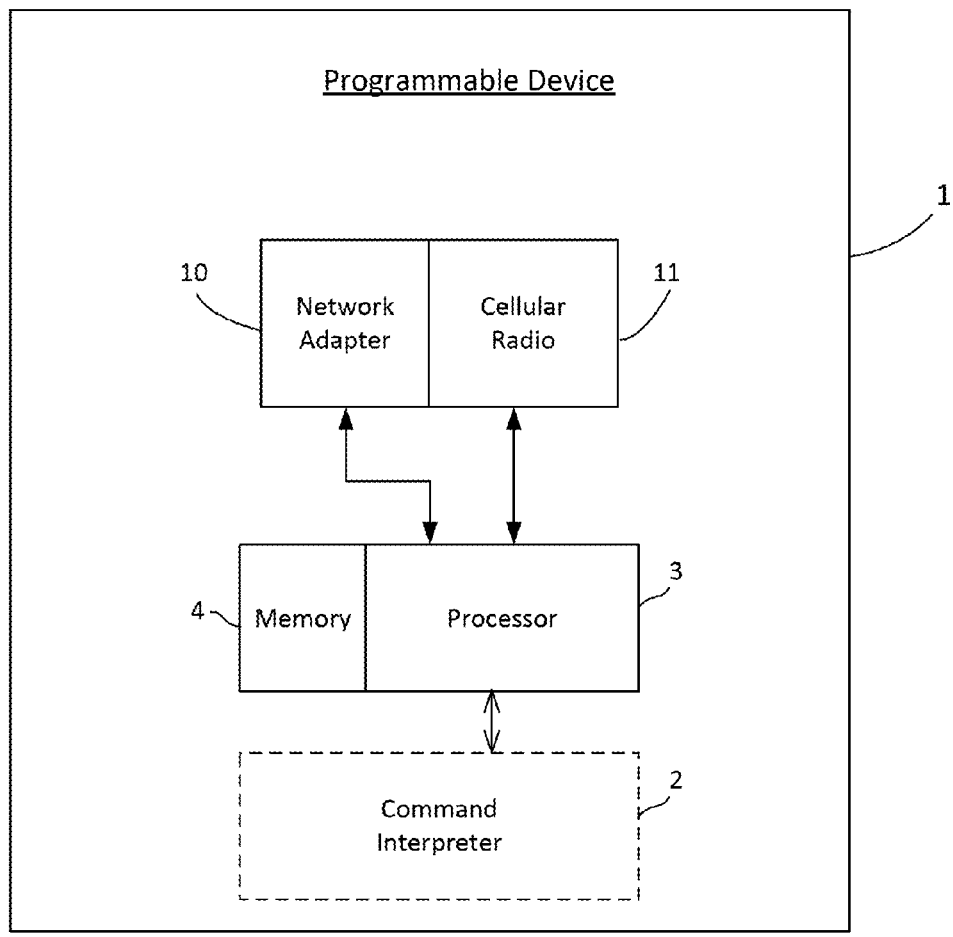
FIG. 8 is a block diagram of an embodiment of the EDC system illustrating programming/reprogramming or configuring/reconfiguring the operation of a network interface or a cellular transceiver based upon the received message.

As described later, FIG. 8 shows an example operational flow diagram for processing a "phone" command to determine the intent of the message. In addition, data corresponding to the command may be extracted from the message and processed. In FIG. 8, an example is described for how extraneous "-" characters in the data, such as a phone number string, entered by the user, are ignored, and the command and data are successfully extracted and processed in the programmable device without generating an error message, or failing a compiling routine. In other examples, any other extraneous characters or anomalies could be similarly processed.

Following processing to extract the intended command and corresponding content data from the text message, the resultant text message command and payload can be implemented by the processor. For example, the content data included with a corresponding command may be stored at a predetermined location in memory based on the command. In another example, logic within the electronic device may be altered using the data based on the corresponding command. In an example, data may be entered into the controller to adjust the operating conditions, or to command an event to happen based on the corresponding command.

Figure 7:
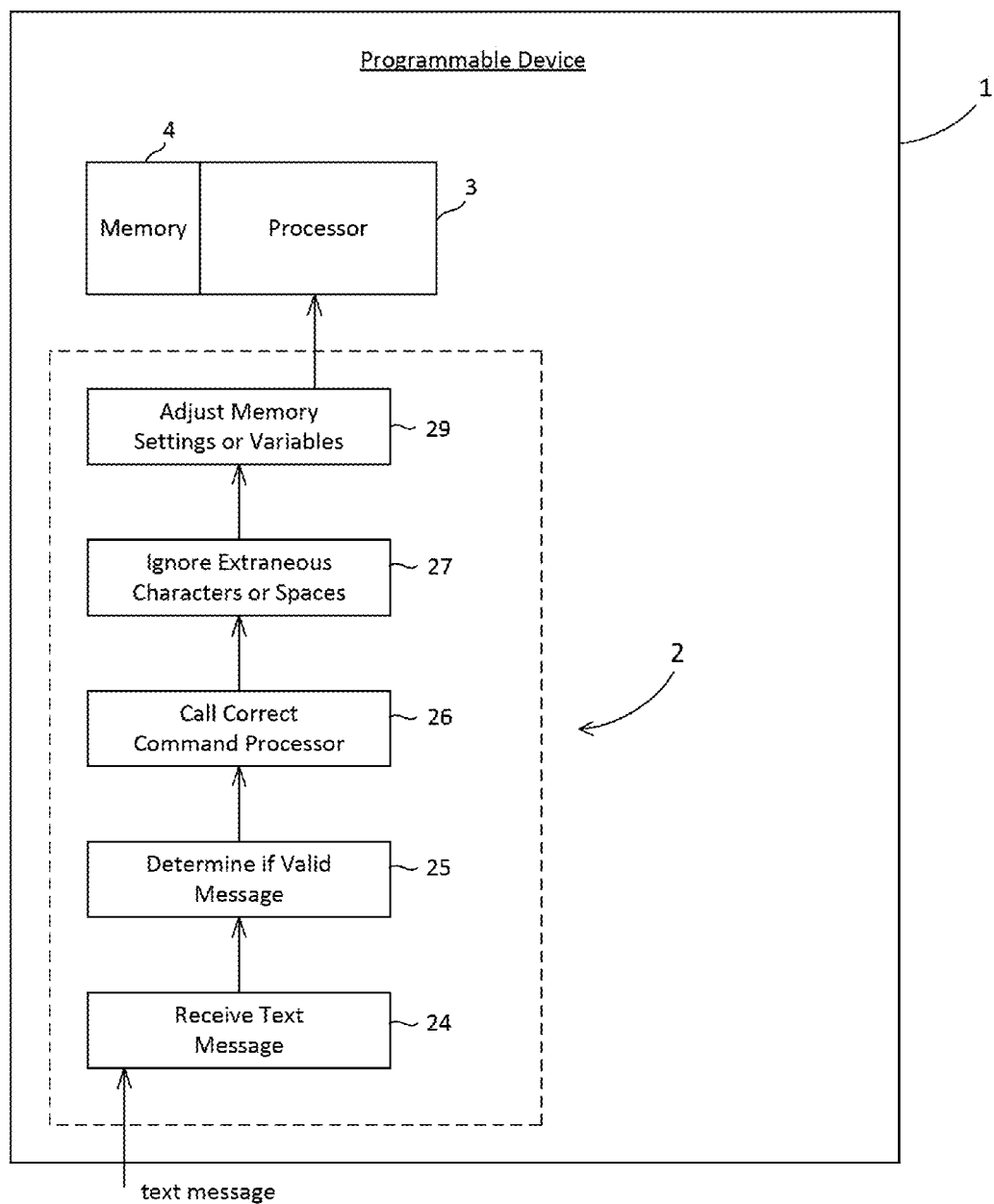
FIG. 7 is a block diagram of an embodiment of the EDC system illustrating programming/reprogramming or configuring/reconfiguring the operation of the programmable device memory based upon the received message

FIG. 7 is another example operational flow diagram of an embodiment of the programmable device 1 that includes the EDC system. In FIG. 7, the programmable device 1 receives a text message command at block 24 and the processor 3 uses the text message command interpreter 2 to process the message, as previously discussed. Using the command interpreter 2, the processor 3 determines if a valid message has been received at block 25, as previously discussed, and then passes the data to block 26 in which the processor 3 determines and calls the correct command processor routine. The command processor module can intelligently interpret commands even if the unstructured content included with the commands contain extra spaces or extraneous delimiting characters at block 27, thereby exempting the user from inputting data in an exacting format, as previously discussed with reference to FIGS. 4-6 and 8. FIG. 8 shows an example processing of the "phone" command, and how the extraneous "-" characters in the phone number string, entered by the user, are ignored, and the command is successfully processed in the programmable device without generating an error message, or failing a compiling routine, as previously discussed. In one example, the resultant text message command and payload can parsed and entered into a predetermined location in the microcontroller's memory 4,7, such as to adjust stored variables, data or settings at block 29. This ability is useful, for example, to change the permanent set point of a setpoint, such as an alarm time delay and store it to memory, such as permanent FLASH memory, so that the data is not lost in case of a backup battery failure.

FIG. 8 is another example aspect of embodiments of the programmable device 1 that includes an EDC system and can perform an operational flow diagram that includes receiving a text message command (block 24—FIGS. 4-7) into the text message command interpreter module 2. In this example, the processor 3 may use the command interpreter module 2 to determine if a valid message has been received (block 25—FIGS. 4-7), and then pass the unstructured data to the next block to determine and call the correct command processor module (block 26—FIGS. 4-7). The command processor can intelligently interpret commands and unstructured data, as previously discussed. In this example, the resultant text message command may be a command to configure the network adapter 10 and/or the cellular transceiver 11. Thus, as a result of such a command, the processor 3 may extract the corresponding unstructured payload from the message for entry by the processor into the network adapter 10 or cellular transceiver 11 to, for example, adjust stored variables, data or communications settings. This ability is useful, for example, to change the permanent IP address of a destination device and store it to memory, such as permanent FLASH memory, within the respective devices so that it is not lost in case of a backup battery failure.

Figure 9:
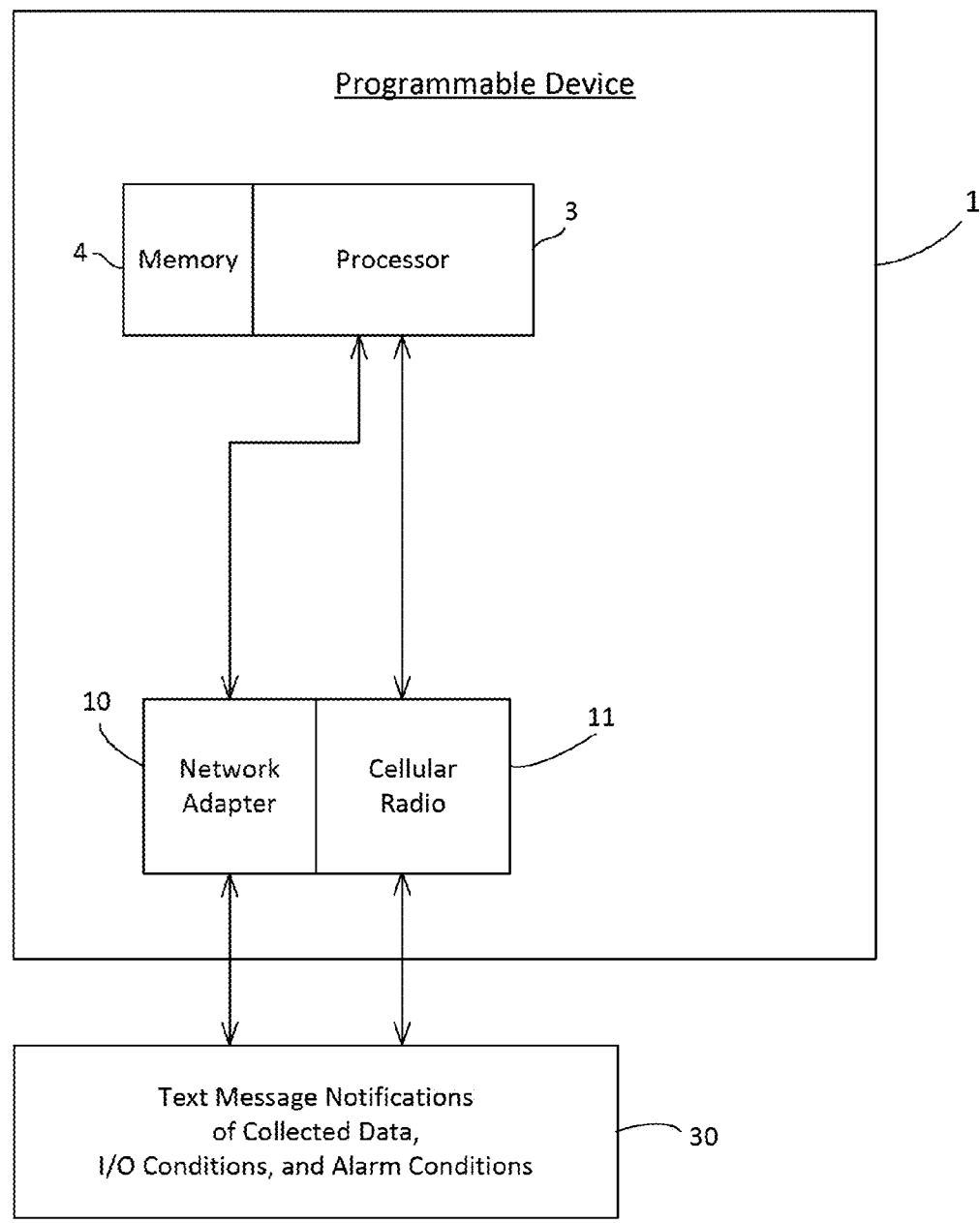
FIG. 9 is a block diagram of an embodiment of the EDC system illustrating notifications to a user of collected data, conditions, and alarms from the programmable electronic device based upon previously received configuration messages.

FIG. 9 is another example aspect of embodiments of the programmable device 1 that includes the EDC system. In this example, text messages 30 can not only be received by the programmable device 1, but can also be generated and sent by the programmable device 1 to a remote user via text message 30 based upon text message instructions received by the device 1. In this example, the programmable device 1 may be previously configured using text message commands to generate and send a text message. As part of the previous configuration, not only could the conditions under which a text message is generated be set up, but also the actual text content of the text message to be generated could be established. Thus, the received text messages can adjust the programming and operation of the programmable device, not just turn items on/off and generate alarms, and the resultant change in configuration via received text messages can cause the generation and transmission of user notifications according to newly received rules for operation of the programmable device 1.

Figure 10:
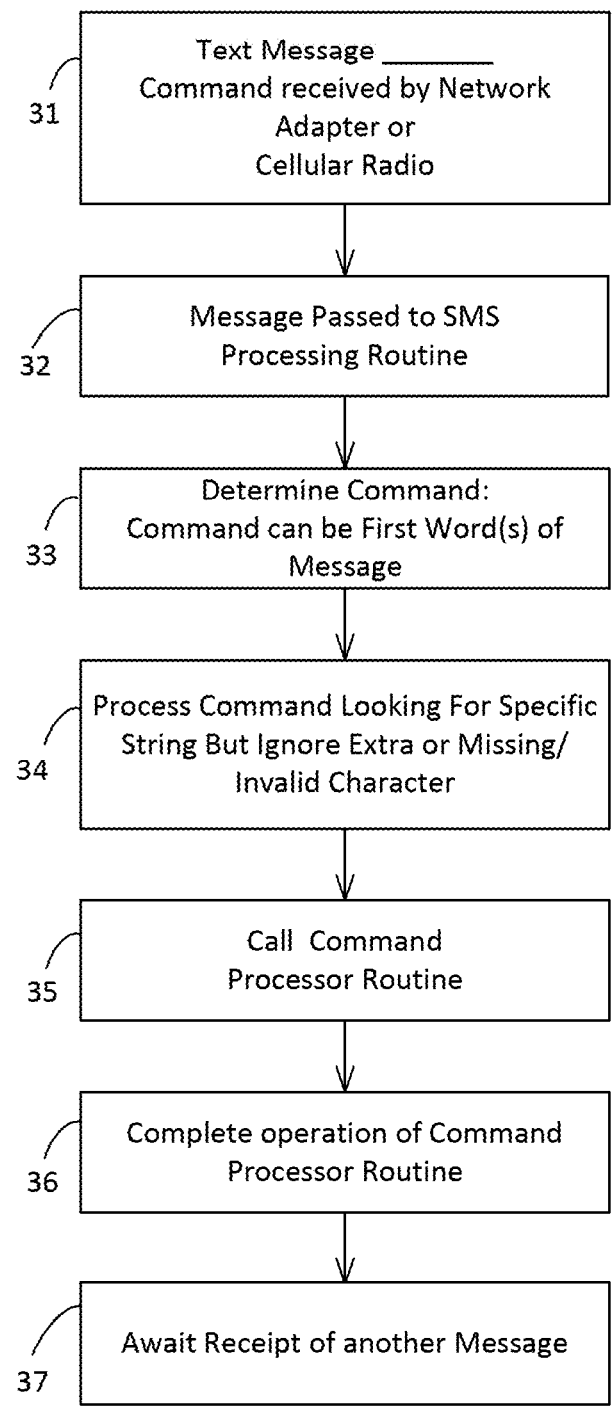
FIG. 10 is an example operational flow diagram illustrating the functionality of the text message command interpreter.

FIG. 10 is an example operational flow diagram illustrating the functionality of the text message command interpreter 2 acting on a received message, such as a command such as the example "phone1" command at block 31. In this example, the "phone" command is used to set the phone number of a recipient (recipient #1) designated by the user to receive alarm messages should the programmable device encounter a predefined condition, such as a critical event. This example is only one of many different possible examples of messages that can be received by the programmable device 1. In other examples, with different various messages, the details of the functionality that supports each corresponding command will also vary, while still fulfilling the goal of avoiding the user having to remember complex commands, formatting and structure of the content. Thus, not only in this described example command, but with any other command, the programmable device can be configured with the convenience and ease of a communication device, such as a cell phone, thereby eliminating the need for specialized programming skills, software packages or reference materials and tools.

Other examples of commands and corresponding unstructured content that may be used in the EDC system include "name" which can be used to give a name to the EDC system descriptive of the application. For example, in the case of a sump pump application, the example message "name John Jones House" sent to the EDC system can be used to instruct the EDC system to append "john jones house" to each alert message, so that the message can be identified as coming from the John Jones' house. Another example command is "contractor," which can be sent as an example message in the following format "contractor Fred Jones Plumbing Co" to program the EDC system to append "Fred Jones Plumbing Co" to all alert messages, in order to provide the user contact information to call in case of an emergency alert. Still another example command is "contact," which can be used in an example message format as "contact 317-555-1234," to associate the contractors phone number to a contractor name, to allow the EDC system to also append the contractors phone number to an alert message. An example command "status" can allow the user to send a message to the unit at any time to request the processor to provide a reply message containing the operational status of the unit such as power present, input states, battery voltage, signal strength and/or any other useful data. The data provided by the processor in response to the "status" command may also be configured by the user using messages. The example command "gallons" can be sent as a message to the EDC system in a predetermined format, such as "gallons 10.2" to indicate to the EDC system the volume of water is 10.2 gallons evacuated from the sump pump pit each time the pump starts/stops. The example command "settings" can be sent to the EDC system to receive in a response message all user command settings, and the example command "history" can be sent to the EDC system to retrieve a list of a previously transmitted or received messages, such as the last 10 alert events time with date stamps.

In the example operation of FIG. 10, once the command is received, the message can be passed to a message processing module included in the command interpreter module, such as an SMS (short message service) processing routine at block 32. The message processing module may determine a command the user is requesting be carried out from the first "word" in the message at block 33. The first "word" may occupy a group of character locations that start at a first character location representing the beginning of the text message. The message processing module may look for specific strings of characters. The specific strings of characters may be predetermined commands that are compared to predetermined character strings stored in memory. In an example text message of a phone number configuration text message, the message processing module may detect the term "phone" in an incoming text message by comparison with the stored predetermined character strings to identify a substantially matching entry. The message processing module can ignore any leading or trailing spaces or delimiting characters at block 34 during identification of the substantially matching specific string of characters. If the message processing module is unable to identify a specific string of characters in the message that substantially match a stored character string, a reply error message may be generated and transmitted by the electronic device. Substantially matching character strings may be character strings that come with a predetermined percentage of matching such as 90% matching. For example, if there are transposed characters, or a relatively small number of different characters in the compared character strings, the system may determine the character strings as substantially matching. Accordingly, extra spaces, or minor typographical errors introduced by a user generating a message that includes a command may be ignored by the system in order to provide a "forgiving" functionality with regard to commands in received character strings.

Once a specific string of characters is identified in the message, the processor may call a corresponding command processing module at block 35 to process the command that corresponds to the identified string of characters. Using the command processing module the processor may control sequential analysis of the unstructured string of characters in the character locations of the message following the command to identify the payload or content of the message.

Figure 11:
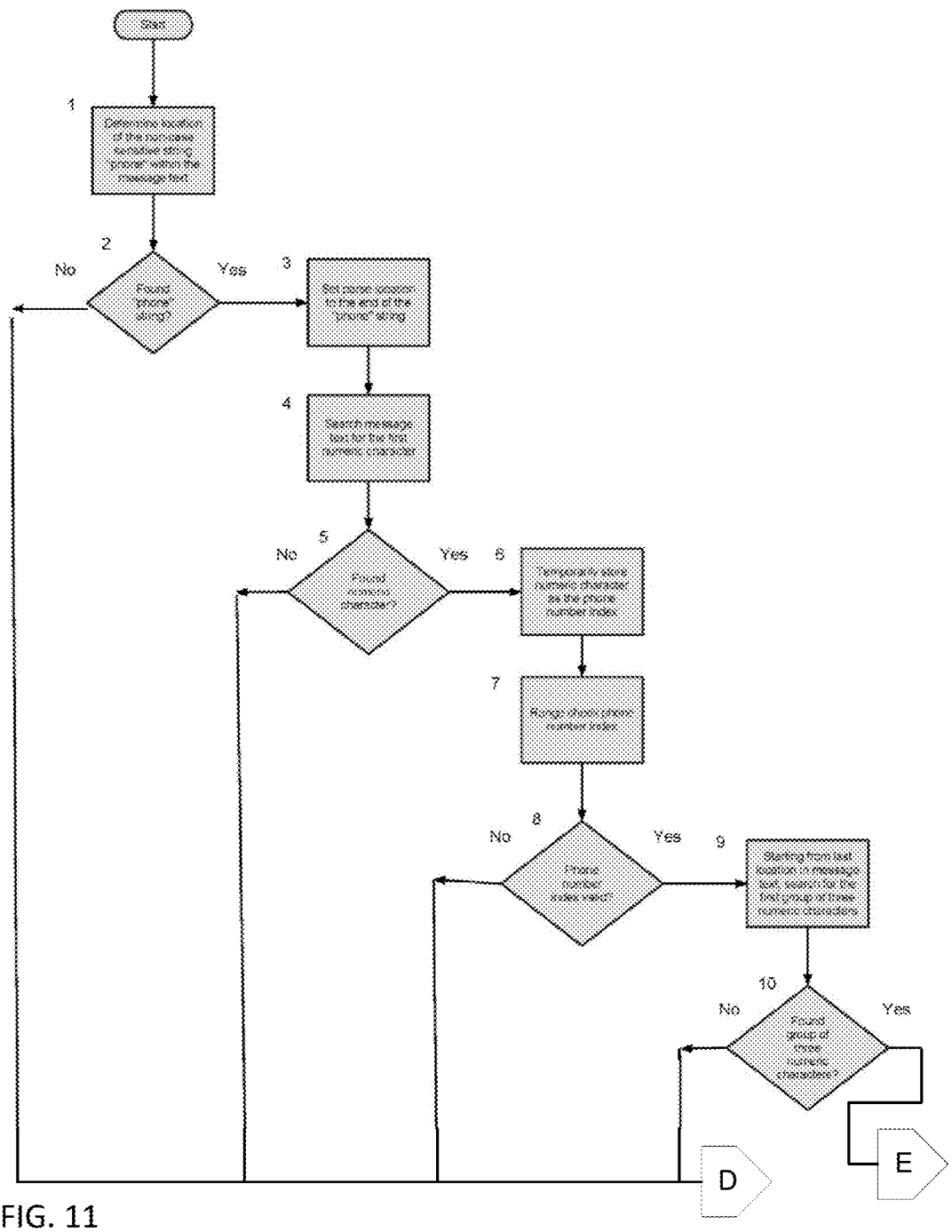
FIG. 11 is an operational flow diagram of example operation of a phone command processing module.
Figure 13:
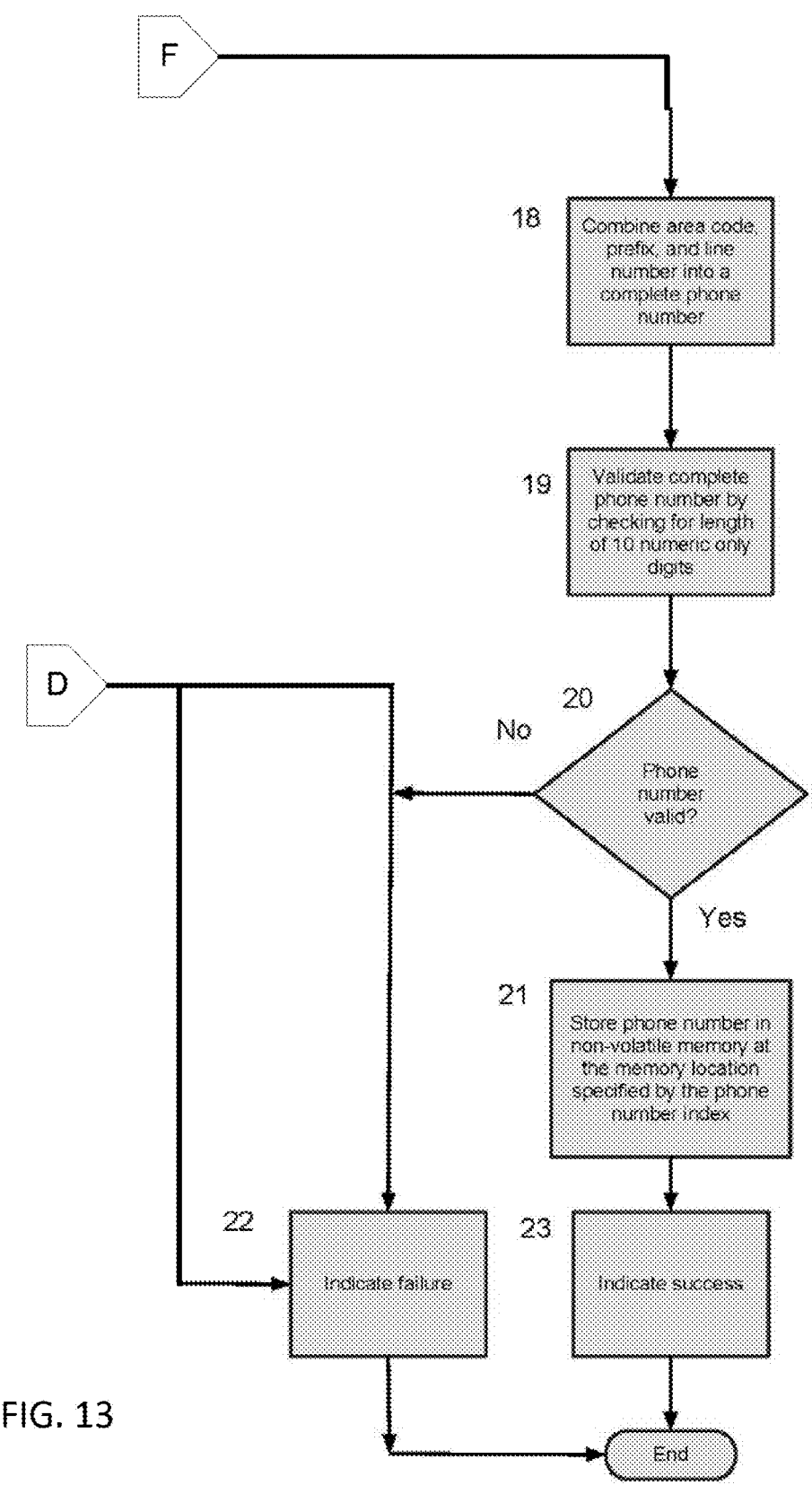
FIG. 13 is a third portion of the operational flow diagram of FIG. 11.

FIG. 11 is an operational flow diagram of example operation of a phone command processing module that is executed by the processor in response to receipt of a phone number configuration text message, which in this example is identified by a command "phone" included in a received message that has been parsed. In other examples, other commands may be identified and character locations included in the unstructured contents parsed for an incoming message. The operation includes performing a non-case sensitive search of the character locations included in the unstructured message text content following the string "phone" to identify content of the message having similar characteristics, such as characteristics of numerals, at block 1. If a character string is not found in the any of the character locations following the string "phone" at block 2, the processor may indicate failure at block 22 (FIG. 13). If a string is found in various character locations, the processor can continue processing by setting the current parsing location within the message text to the end of the previously identified command "phone" string at block 3. Starting with the current parsing character location, the processor may sequentially search the remainder of the character locations in the text message for similar characteristics, such as numeric characteristics, to identify a first numeric character in the unstructured content of the message text at block 4. At block 5, it is determined by the processor if the message text includes a numeric character. If a numeric character is not found in the unstructured content, the processor may indicate failure at block 22 (FIG. 13). If a numeric character is found, at block 5, the processor may continue processing. The processor may temporarily store the identified numeric character in a memory location, such as in volatile memory, as an identifier of a phone number index at block 6. The phone number index is an identifier identifying the memory location in which to store the phone number included in the message. In example embodiments, the EDC system may support up to three memory locations with a predetermined index range, such as from 1 to 3.

At block 7, the processor may perform a range check on the phone number index to ensure that it is within the predetermined range, such as greater than or equal to 1 and less than or equal to 3. The processor may determine if the phone number index is valid at block 8. If the phone number index is not valid, the processor may indicate failure at block 22 (FIG. 13). If the phone number index is valid at block 8, the processor may continue processing the message. At block 9, from a last parsing location of the message, which is the character location where the phone index was identified, the processor may search for a first group of numeric characters in the message determined to have a predetermined number of similar characteristics, such as three numeric characters. By searching the remaining character locations for only numeric characters to meet the criteria for being included in the first group, it allows the user to enter a phone number with various formats (ex: (765) 333-1234, or 765-333-1234, or 765 333 1234, or 7653331234, and so on). Accordingly, the EDC system may process groups of numeric characters, while ignoring other characters such as parenthesis, dashes, spaces, in the other character locations. As such, the numeric characters may be in located anywhere among the character locations of the unstructured content with other ignored characters occupying character locations around the numeric characters.

At block 10, it is determined by the processor if a first group of number characters is found. If a first group having similar characteristics, such as numeric characteristics having a first predetermined number, such as three characters, is not found, the processor may indicate failure at block 22 (FIG. 13). If the first group of numeric characters is found, the processor may continue processing.

Figure 12:
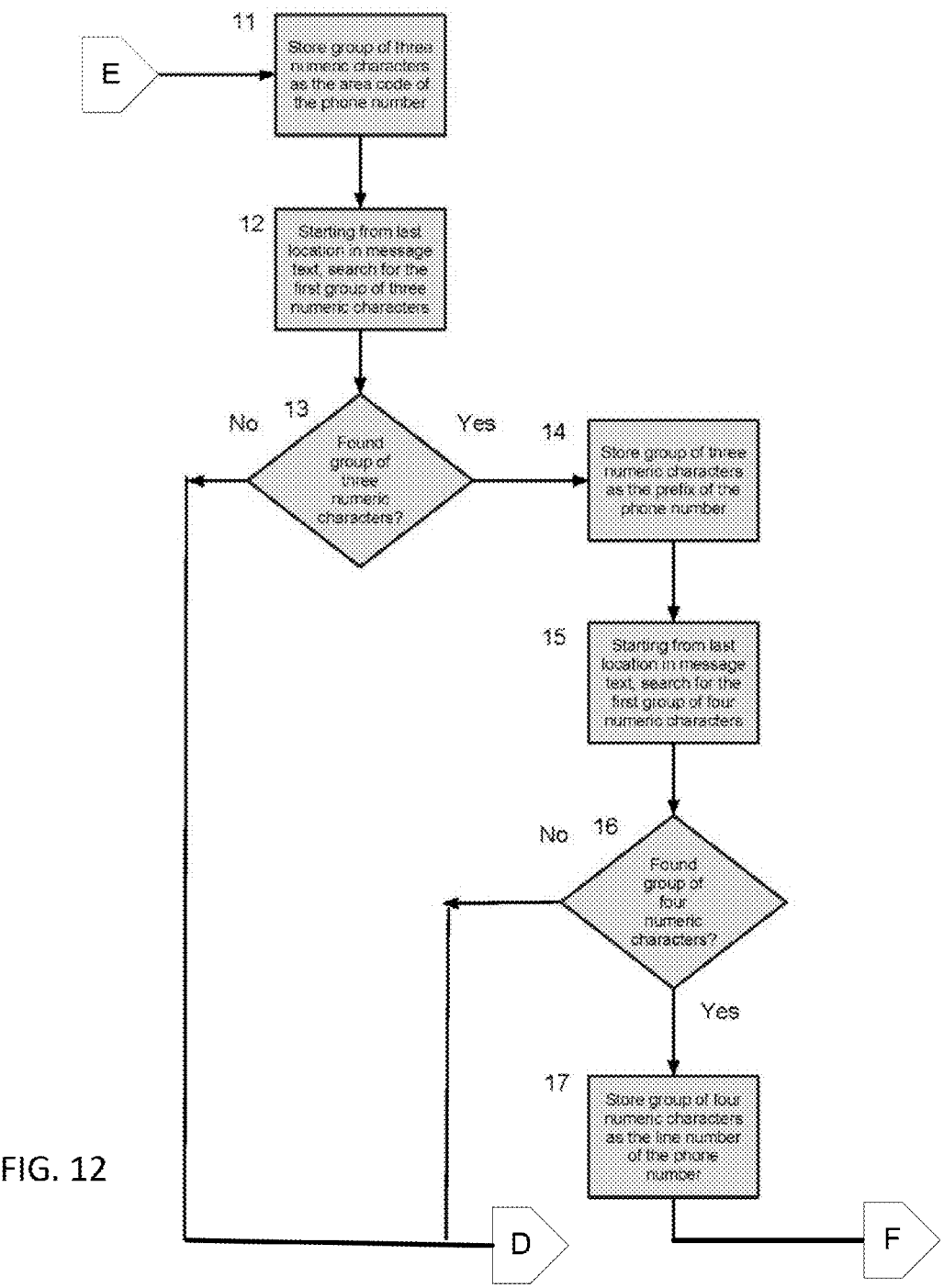
FIG. 12 is a second portion of the operational flow diagram of FIG. 11.

Referring to FIG. 12, in one example, the processor may temporarily store in memory the identified group of numeric characters as an area code of the phone number at block 11. From the last parsing location of the unstructured content of the message where the last character in the first group was identified, the processor may further search for a second group having similar characteristics, such as numeric characteristics that can be used to form a second predetermined number of characters, such as three numeric characters at block 12. At block 13, it is determined by the processor if a second group of numeric characters is included in the unstructured content of the message by ignoring characters other than those having similar characteristics, such as numerical characteristics. If a second group of numeric characters is not identified, the processor may indicate failure at block 22 (FIG. 13). If it is determined that a predetermined number having similar characteristics exist to be identified as the second group of numeric characters at block 13, the processor may continue processing. In one example, the processor may temporarily store the identified second group of numeric characters as the prefix of the phone number at block 14. From the last parsing location in the message where the last character in the second group was identified, the processor may search for a third group of numeric characters, such as a group of four numeric characters at block 15. At block 16, the processor determines if a third group having similar characteristics, such as numeric characteristics of a third predetermined number can be identified in the unstructured content of the message by ignoring characteristics other than characteristics such as numerical characteristics. If the third group of numeric characters is not found, the processor may indicate failure at block 22 (FIG. 13). If the third group of numeric characters is identified, the processor may continue processing. In one example, the processor may temporarily store in memory the third group of numeric characters as the line number of the phone number at block 17. In other examples, other numbers of groups and/or group sizes may be identified. In addition, or alternatively, other characters having similar characteristics, such as characteristics of letters or symbols, may be identified in the groups, by comparing the unstructured content with a predetermined stored list of characters, or characteristics representative of characters of interest, to ignore and/or to identify as members of one or more of the groups.

Referring to FIG. 13, the processor may then extract the identified first group of numbers, the second group of numbers, and the third group of numbers from temporary storage, and combine the area code, prefix, and line number into a complete phone number at block 18. In other examples, any number and size of groups of numeric values may be identified and stored. The processor may then validate the complete phone number by checking that it is all numeric characters with a predetermined length, such as 10 characters at block 19. At block 20, the processor can determine if the phone number is valid. If the phone number is not valid, the processor may indicate failure at block 22. If the phone number is determined to be valid at block 20, the processor may store the phone number in memory, such as non-volatile memory at the memory location specified by the phone number index at block 21. Upon storage of the phone number in non-volatile memory, parsing and command execution is successful, and the processor may indicate success at block 23.

Referring again to FIG. 10, at block 36, the processor my direct completion of operation of the command processing module. At block 37, the processor may await receipt of another message.

As previously discussed, in the example of the phone command processing module, different phone numbers may be stored in different locations. During the parsing of an unstructured message, the module may look for next numeric characters in the sequence, and then store a predetermined number of characters, such as the next three sequential characters, as a first group of characters into a temporary memory buffer included in the memory. These three numbers in the first group can be identified as the phone number area code. Following, storage of the area code, the phone command processing module can look for the next sequential numeric character, ignoring any non-numeric characters. Once the next numeric character is identified, then the next two numeric characters in the sequence may also be identified, and the three numeric characters may be stored to the temporary memory buffer as a second group of characters. These three numeric characters in the second group may be identified as the prefix of the phone number. The processor again searches sequentially for the next four numeric characters, again ignoring non-numeric characters. Once found, the next four characters sequentially identified may form a third group that is appended to the temporary buffer. These four characters in the third group can be identified as the final four digits of the phone number. The phone command processing module can then verify that the temporary buffer has ten, numeric-only characters in its' memory formed in a first, second and third group. If so, the command is executed to update a memory variable location, such as "phone1," which may be successfully altered to contain the phone number of recipient number 1 based on the numeric character "1" being included in the unstructured content of the message with the identified command. When a message is received that includes "phone2" as the command, a different memory variable location may be updated with a phone number of recipient number 2. Any number of memory variables may be allocated to storing recipient phone numbers. Thus, a user can selectively update different recipient phones numbers using the command "phone" followed by an identifier of the recipient as 1, 2, 3, . . . , N in the unstructured content of the message.

Transceiver Control Scheme

In an embodiment, the EDC system may include a transceiver control scheme for the cellular transceiver. One or more of the following functions may be included in the operation of the cellular transceiver within the EDC system.

Power On: The system can power on the transceiver and check for serial communication. If serial communication cannot be established, the system retries a predetermined number of times, such as 3 times, and then shuts down the transceiver for a predetermined period of time, such as 5 minutes. After the predetermined period of time, the system may again retry the sequence.

Configuration: The system may issue various configuration commands to configure the cellular transceiver. The configuration commands may be in a predetermined command language, such as commands from Hayes AT command set. If any of the configuration commands fail, the system shuts down the cellular transceiver for a predetermined period of time such as five minutes. After the predetermined period of time, the system restarts at the "Power On" step.

Idle: Once the cellular transceiver is configured, it may go into an idle state during periods of non-use. At a predetermined interval, such as every fifteen seconds, configuration commands can be issued to query operational parameters, such as signal strength, network status, network time, and the number of received messages, such as SMS messages. If an error occurs while issuing these commands, the system can attempt to recover gracefully by re-issuing the commands. If the attempt to recover fails a predetermined number of times, such as five times, the system may prevent the cellular transceiver from transmitting and receiving wireless communications for a predetermined period of time, such as five minutes. After the predetermined period of time, the system may restart at the "Power On" step.

Processing Incoming Messages

The EDC system may process incoming messages, such as SMS text messages, using one or more operational techniques based on commands received in the messages as previously discussed. In example embodiments, the system may first determine the command included in the message: As previously discussed, the command can be the first word or words of the message. The command is processed by looking for specific strings such as "phone" or "settings" within the message. Once the type of command is determined, the specific routine to process the command is called. The specific routine may then process data included in the respective message in accordance with the expected data included with the identified command. The remaining text after the command text is processed depending upon the corresponding command. For example, in processing a "Phone" command, the system expects an index as part of the command text, and a predetermined number of numerical digits, such as a 10 digit phone number after the command text (ex. phone 1 434-333-4433), as previously discussed. In this example, the system allows the phone number entry to be flexible by ignoring non-numeric characters, extra spaces and/or delimiters entered by the user. For example, the algorithm can handle input such as "phone1 (434) 333-4433" or "phone 1 434 333 4443" or "phone 1 4343334433". In examples of other commands, the system may similarly ignore entries by a user that are not important to the command.

Outgoing Messages

The EDC system may generate and transmit various outgoing messages based on predetermined parameters, such as parameters set using incoming messages. Messages may be generated, for example, in response to operational conditions or receipt and processing of incoming messages. Messages may be notification messages to a user, control messages to another programmable device, or a combination thereof. Messages may be SMS messages. Alternatively, or in addition, messages may be emails, web page updates, voicemail messages or any other form of alert that can be perceived by a user. The EDC system may perform one or more of the following operations during generation and transmission of outgoing messages:

Enqueue Messages: Notification messages may be enqueued in a buffer, such as first-in-first-out (FIFO) buffer when specific events occur, such as an alarm condition for a variable input to the system. In an example embodiment, in order to conserve memory, only a message type enumeration may be stored in the buffer, and the actual message text to be used in the outgoing message may be built later. The message type enumerations may be a predetermined list that is mapped actual message text used in outgoing messages.

Figure 14:
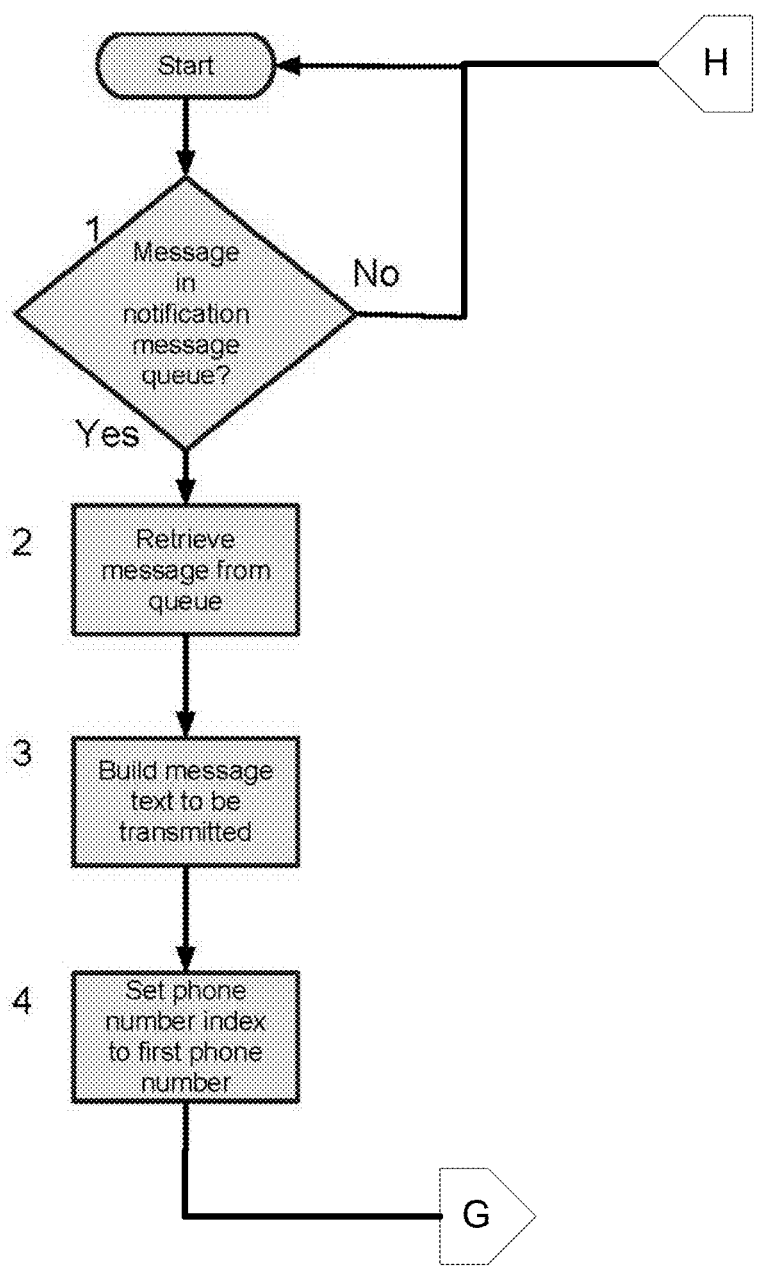
FIG. 14 is an operational block diagram describing example operation of the EDC system in generating and transmitting outgoing messages.

FIG. 14 is an operational block diagram describing example operation of the EDC system in generating and transmitting outgoing messages. As previously discussed, incoming messages may be retrieved from the cellular transceiver by issuing configuration commands requesting that the message text be passed to the Message Processor module. Outgoing messages, on the other hand, may be generated and transmitted based on outgoing messages being generated, for example, in a notification message queue. In other examples, other triggering mechanisms, such as a particular event, a user request, a number of discrete messages in a queue, or an incoming message may trigger the generation and transmission of an outgoing message. At block 1, it is determined if there is one or more messages in the queue. If there is at least one message in the notification message queue, the processor may retrieve the message from the notification message queue at block 2. At block 3, the processor may build the text string that is to be sent based on the notification message in the queue. The EDC system can send separate and independent, or group list messages to a predetermined number, such as up to three different phone numbers. The different recipients may be configured by the user using messages and, for example, the "phoneN" command, as previously discussed. In this example, independent messages are sent to recipients via user configured recipient phone numbers. At block 4, the processor may begin the process or sending messages from the first user configured phone number, such as index 1, by setting the phone number index to the first phone number. In other examples, the recipient(s) of the message may be determined by other mechanisms, such as from the contents of an incoming message that contains, for example, one or more destination phone numbers.

Figure 15:
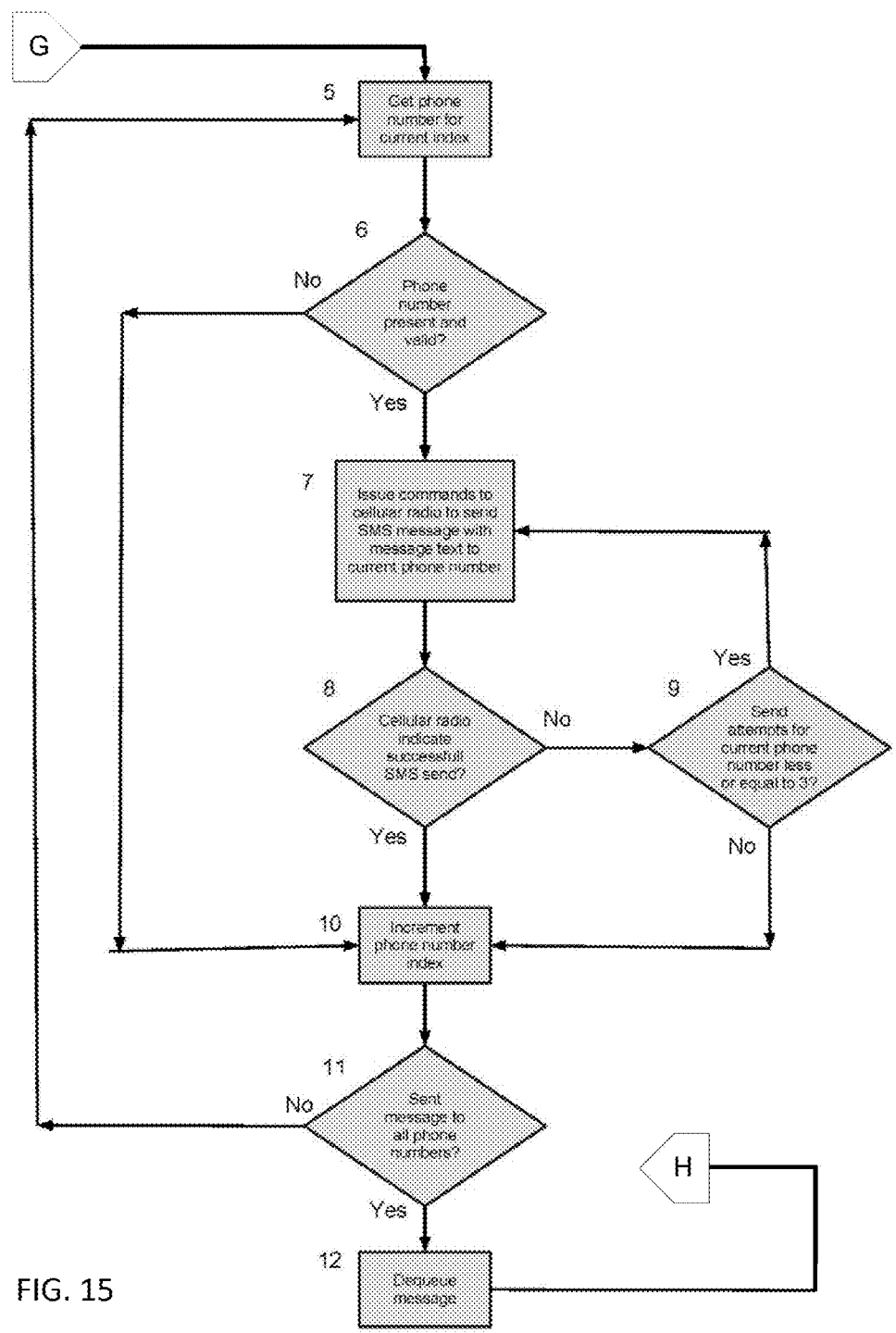
FIG. 15 is a second portion of the operational flow diagram of FIG. 14.

Referring to FIG. 15, the processor may retrieve the phone number for the current index at block 5. At block 6, it is determined if the phone number at the current index is present and valid. If the phone number is not present or is not valid, the processor does not attempt to send the message to the phone number included in the current index, and the phone number index is incremented at block 10. If the phone number is present at the current index and valid at block 6, the processor continues processing by generating and sending SMS messages by issuing transmit commands, such as ASCII commands to the cellular transceiver via a communication interface, such as a UART at block 7. The processor provides the message text and the destination phone number for the message as part of the transmit commands. After the cellular transceiver executes the ASCII commands, it provides the result of the commands. The processor monitors the results returned by the cellular transceiver to determine if the message was sent successfully at block 8. If the message send was indicated as successful, the next phone number is prepared by incrementing the phone number index at block 10. If the message send is indicated as unsuccessful at block 8, at block 9, the processor will try again to provide the transmit command to the cellular transceiver a predetermined number of times, such as a total of three attempts. At block 9, if there are less send attempts than the predetermined amount, the processor will try issuing the commands to send the message again by returning to block 7. If there are more than 3 attempts at block 9, the processor will prepare the next phone number by incrementing the phone number index at block 10. As previously mentioned, the EDC system can send to a predetermined number of phone numbers, such as up to three phone numbers. Thus, the processor may prepare to send a message to the next phone number by incrementing the phone number index.

At block 11, it is determined if messages have been sent or attempted to be sent to all the recipients configured by the user. If the message has been sent to all identified recipients, then the process is complete. If the message(s) has not been sent to all phone numbers, the process returns to block 5 to get the next phone number in the sequence. Once the message(s) has been sent (or attempted to be sent) to all phone numbers, it can be dequeued at block 12. The process restarts by waiting for a message in the message queue.

Transmit Message: The system, and more specifically the processor, may issue configuration commands to control the sending of the messages. The messages may be sent via the network adapter module, the cellular transceiver module, or a combination of both. The destination of the messages may be a user, or another programmable electronic device. In one embodiment, the message may be transmitted to a first identifier, such as a first phone number, included in a callout list stored in the memory with corresponding phone number index values. The callout list may be populated by a user using messages, and phone number index values, as previously discussed. If any of the configuration commands fail, the system may attempt to resend the message a predetermined number of times, such as up to three times. The system may delay for a predetermined period of time, such as five seconds, between retries. If the message is sent successfully, the system moves on to send the message to the next identifier, such as a phone number, included in the callout list. If the configuration commands fail after all retry attempts, the system moves on to send the message to the next phone number in the callout list having the next sequential phone number index identifier or at the end of the retry sequence for the last identifier, such as a phone number, included in the callout list.

Figure 16:
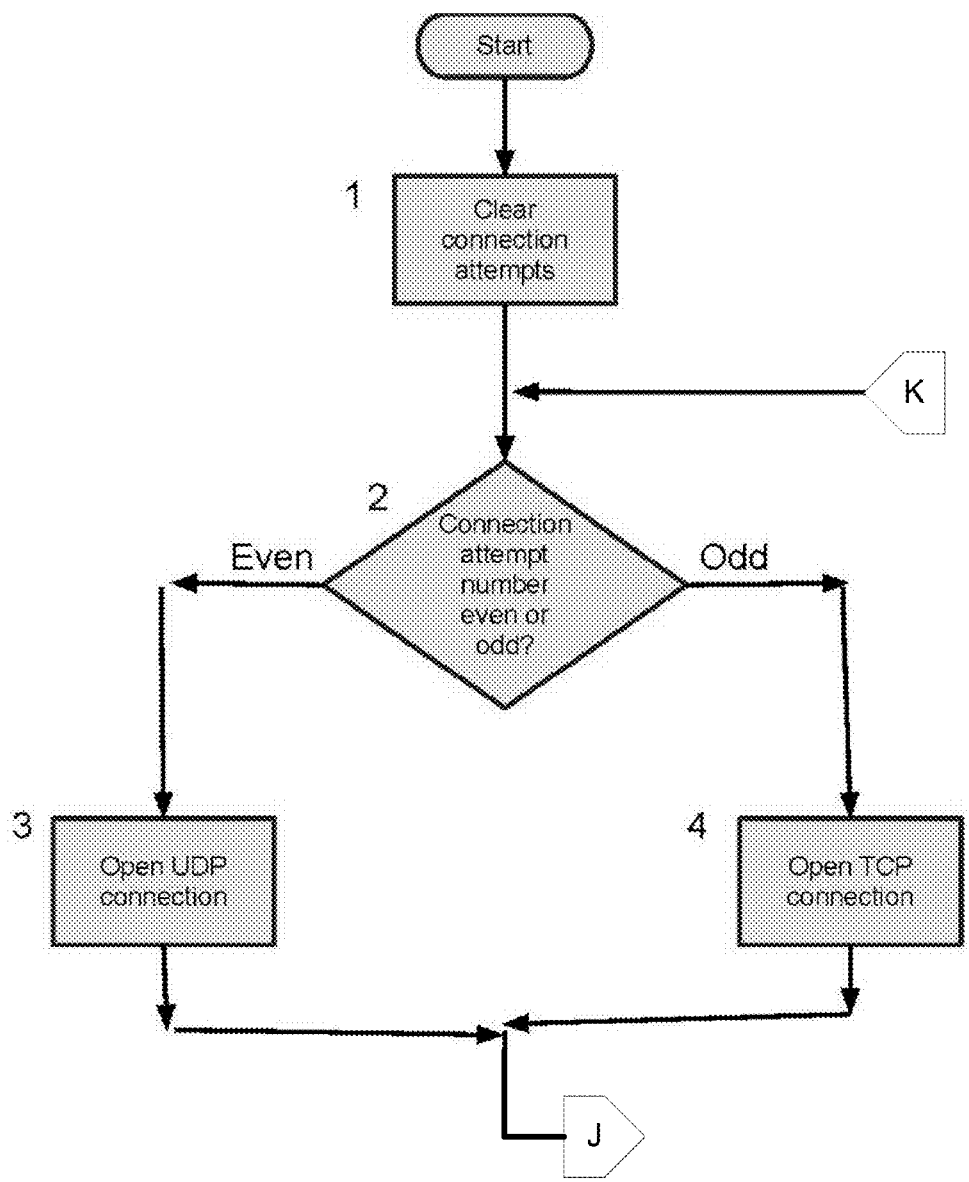
FIG. 16 is an operational flow diagram illustrating operation of an example connection retry routine performed by the EDC system during generation and transmission of messages.

FIG. 16 is an operational flow diagram illustrating operation of an example connection retry routine performed by the EDC system during generation and transmission of messages. At block 1, the operation to transmit a message may include making a data connection by first attempting to clear connection attempts. In some embodiments, the connection attempt may be identified as odd or even to indicate a UDP connection, or a TCP connection, respectively. In other examples, any number of different connection attempts may be included, and may be identified by any form of identification strategy. At block 2, it is determine the type of connection attempt, such as if the connection attempt number is odd or even. If the number of the current connection attempt is even, a first connection, such as a UDP connection is opened at block 3. If the number of the current connection attempt is odd, a second connection, such as a TCP connection is opened at block 4. In some embodiments, the processor may open the first connection, such as a UDP connection with the cellular transceiver by issuing commands, such as ASCII commands via a UART. The processor may open the second connection, such as a TCP connection with cellular transceiver by issuing commands, such as ASCII commands via a UART. The processor may specify the domain name and port number to open the first connection and the second connection.

Figure 17:
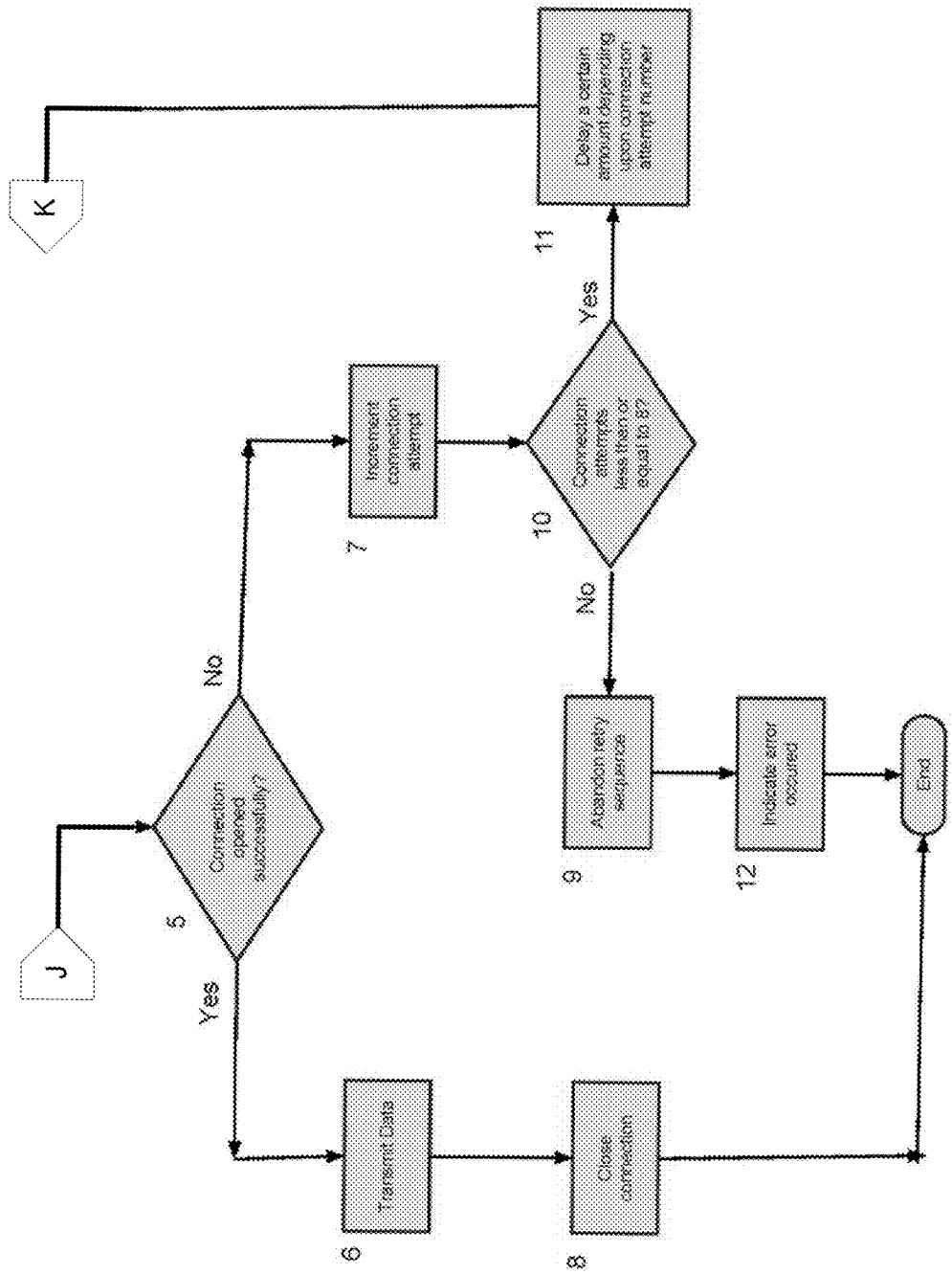
FIG. 17 is a second portion of the operational flow diagram of FIG. 16.

Referring to FIG. 17, at block 5, the processor may determine if the connection opened successfully by monitoring the result of the connection commands. If the connection was opened successfully, data is transmitted through the connection at block 6. If the connection was not opened successfully, a retry sequence is entered at block 7, where the connection attempt is incremented by incrementing a counter, or buffer. At block 10, it is determined if the number of connection attempts have exceeded a predetermined number (how many times the connection attempt buffer has been incremented due to occurrence of a connection attempt). When the number of attempts does not exceed the predetermined number of times, additional connection attempts are attempted by returning to block 2 (FIG. 16). Depending on number of connection attempts less than the predetermined amount, further attempts may be delayed for a predetermined period of time at block 11 before attempting the connection again by returning to block 2 (FIG. 16). If the predetermined number of connection attempts has been reached, such as if the number of connection attempts exceeds 8, the retry sequence can be abandoned at block 9.

In some embodiments, the processor may use the current connection attempt number to determine how long to delay the next connection attempt. The sum of the delay times allows for a predetermined total period of connection attempts, such as one hour, before the sequence is abandoned. An example of predetermined delay times are:

a. Attempt 1: delay 1 minute
b. Attempt 2: delay 1 minute
c. Attempt 3: delay 2 minutes
d. Attempt 4: delay 2 minutes
e. Attempt 5: delay 7 minutes
f. Attempt 6: delay 7 minutes
g. Attempt 7: delay 20 minutes
h. Attempt 8: delay 20 minutes At block 12, an error may be indicated to a different subsystem which logs the error in some way. In addition, alternatively, the user may be alerted of the retry attempts.

Remote Command Line Session with Electronic Device

The EDC system may include a UART. In some embodiments, the UART may be used as a debug terminal. In other embodiments, other debug mechanisms may be used as the debug terminal. The debug terminal may allow a user to see what is currently being executed by the processor, as well as issue various commands. The commands, which may be entered by a user, such as in the same way as a standard command line, can be used to configure the EDC system and/or other programmable devices by setting a unit ID of the device a user desires to interface with, and a time scheduled reports interval. The commands can be used to get the status of the device, such as battery voltage, primary power voltage, radio status, and any many other aspects of the device. The EDC system may include an event log that can also be retrieved through the debug terminal.

The debug terminal may include a table of commands that can be executed. If a command is issued that is not in the table, an error can be provided and/or displayed. Also, if the parameters of a command are not properly formatted, the command parsing routines can detect the problem and provide and/or display an error. When a remote command line session is opened, such as through the network interface module or a direct connect interface module, such as USB interface, a BLUETOOTH™ interface, or any other communication interface, the functionality of the debug terminal is duplicated through the communication connection, such as a TCP, USB, or BLUETOOTH™ connection. Any data that would be displayed on a debug terminal is transmitted through the connection. Any data that is received through the connection can be processed the same way as the debug terminal input. From the standpoint of the remote user, it is like having a direct connection to the debug terminal of the device—there is no change in functionality.

Figure 18:
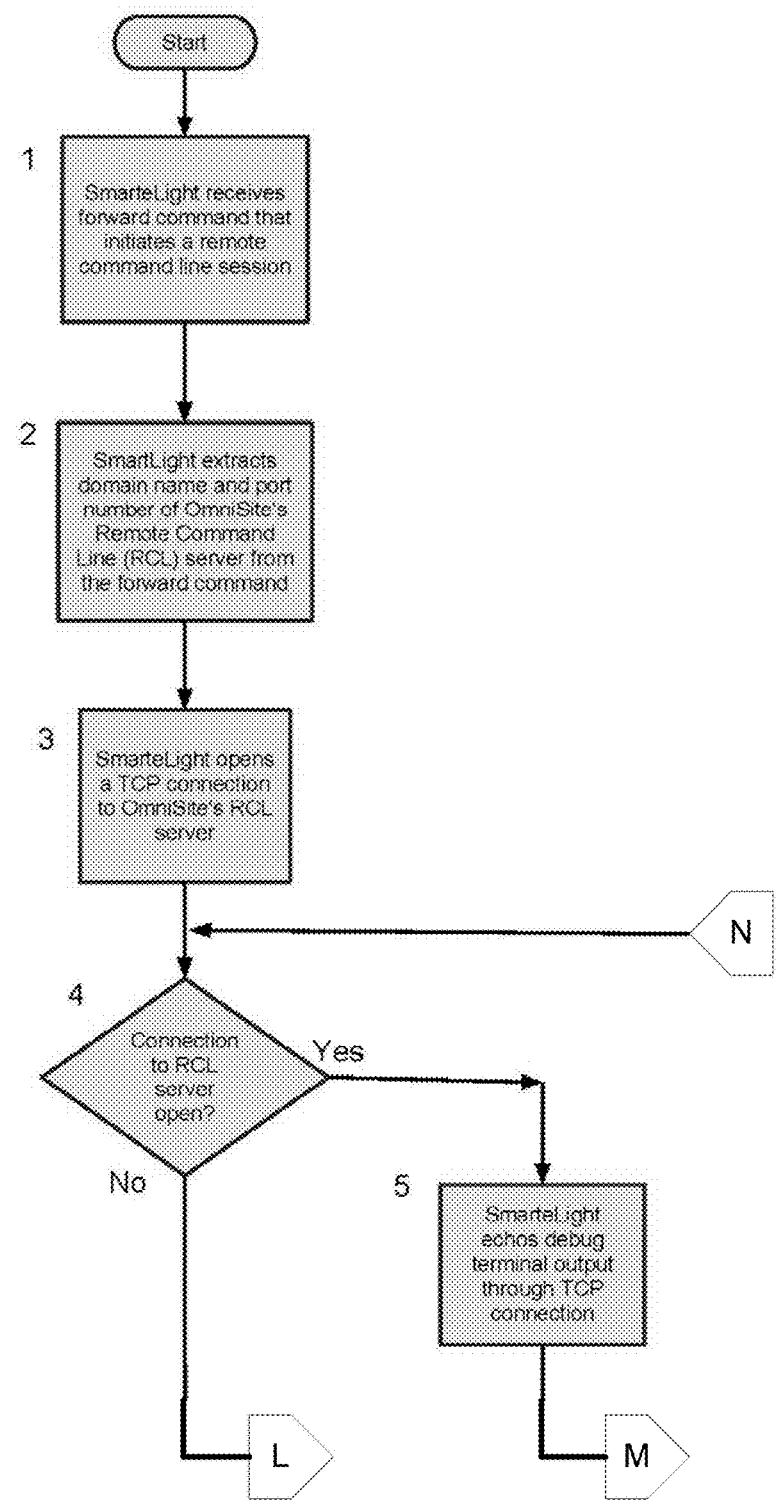
FIG. 18 is an operational flow diagram illustrating example operation of the EDC system during a remote command line session.

FIG. 18 is an operational flow diagram illustrating example operation of the EDC system during a remote command line session. In FIG. 18, an example of a network interface using, for example, the network interface module or the cellular transceiver module is described, in other examples, as previously discussed; a remote command line session can be initiated over a network, or via a local wireline interface, a wireless interface, or any other form of communication interface using a remote command line. In FIG. 18, a remote command line session is initiated when the EDC system receives a message such as a forward command from an external device, such as a server over a network at block 1. When a forward command is received over the network from the server, the EDC system retrieves the message at block 2 and extracts a domain name and port number from the forward command at block 2. The domain name and port number may correspond to Remote Command Line (RCL) server. At block 3, once the domain name and port are extracted, the EDC system may open a connection, such as a TCP connection to the RCL server at block 3. At block 4, it is determined if the connection to the server is open. If the connection is not successfully opened, the operation ends. If the connection to the server is opened successfully at block 4, the EDC begins processing remote command line data. At block 5, information that is sent through the debug terminal is echoed through the connection to the remote command line server. The remote command line server then displays this information to the user.

Figure 19:
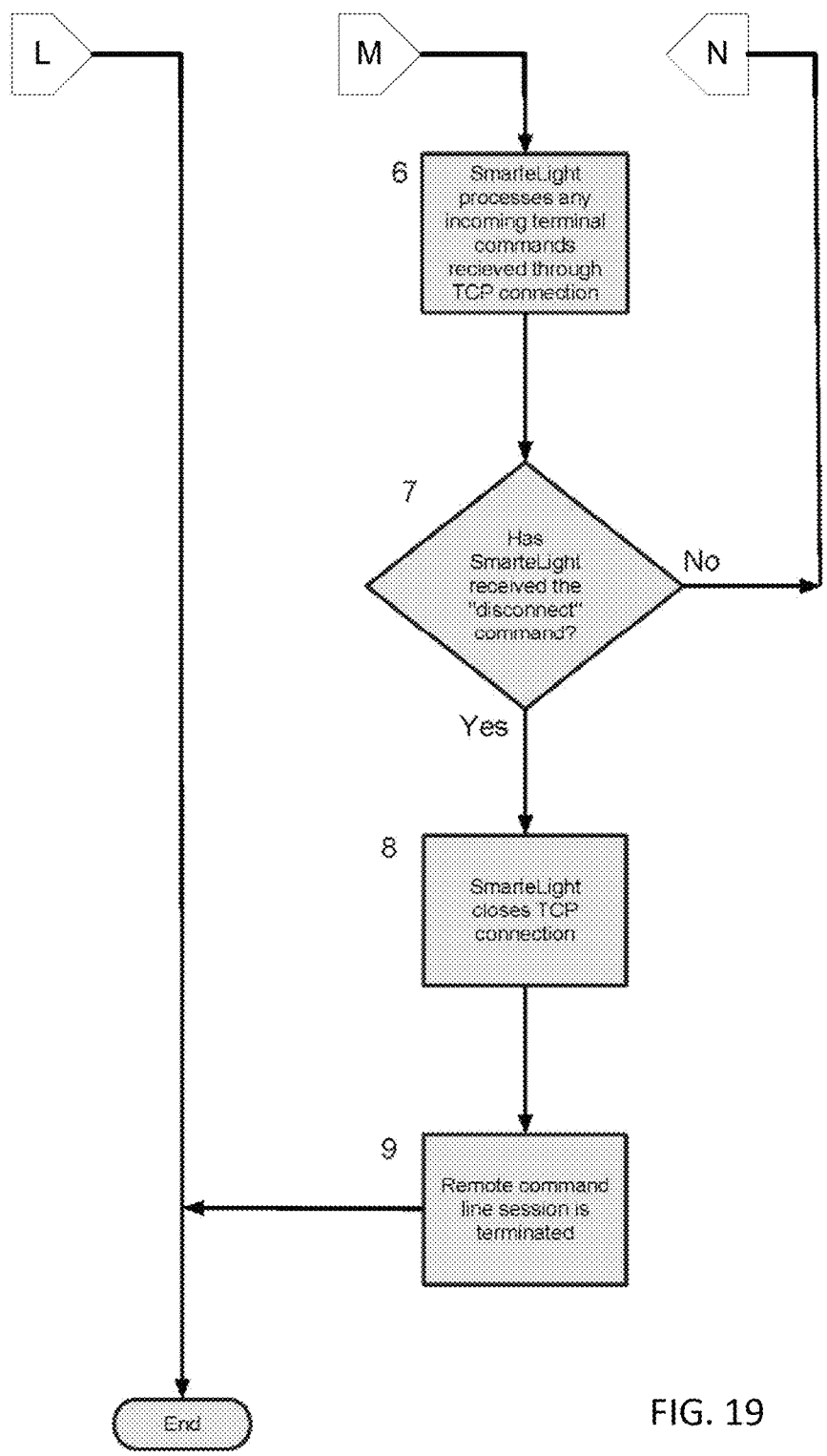
FIG. 19 is a second portion of the operational flow diagram of FIG. 18.

Referring to FIG. 19, at block 6, information received through the connection can be processed the same way as the debug terminal input. As the user types commands at the remote command line server, the commands are transmitted through the connection. The EDC system monitors for a disconnect command at block 7. If a disconnect command is not received, the operation returns to block 4 (FIG. 18) to continue operation. If the EDC receives the "disconnect" command at block 7, it closes the connection at block 8. The EDC system closes the TCP connection to disconnect from the RCL server, and the EDC system terminates the remote command line session at block 9.

As previously discussed, the domain name and port number are stored and a remote command line session is started upon receipt of a command, such as a forward command. A remote command line server application can be running on a server at the domain name and port number specified. The programmable electronic device opens a network connection, such as a TCP connection to the server application. If the network connection fails to open, the system can retry a predetermined number of times, such as up to three times before giving up. Once the session is open, the programmable electronic device can send all command line and debug printouts through the connection to the server. Also, any text entered into the server application can be sent to the programmable electronic device. The system essentially echoes the physical serial port debugging capability over a connection. The session is ended if the programmable electronic device detects that the connection was aborted due to an error or a remote disconnect. Also, the TCP connection may be closed and the session may be ended after a predetermined period of inactivity, such as 5 minutes.

Initiate Remote Command Line Session: The EDC system may operate in conjunction with a server computer using the network adapter module or the cellular transceiver module. The server can generate a forward command that contains a domain name and a port number. The forward command can be transmitted via messages, such as SMS, to the cellular transceiver module of the desired programmable electronic device, as previously discussed. Alternatively, or in addition, the forward command can be received by the desired programmable electronic device via a network and the network adapter.

Figure 20:
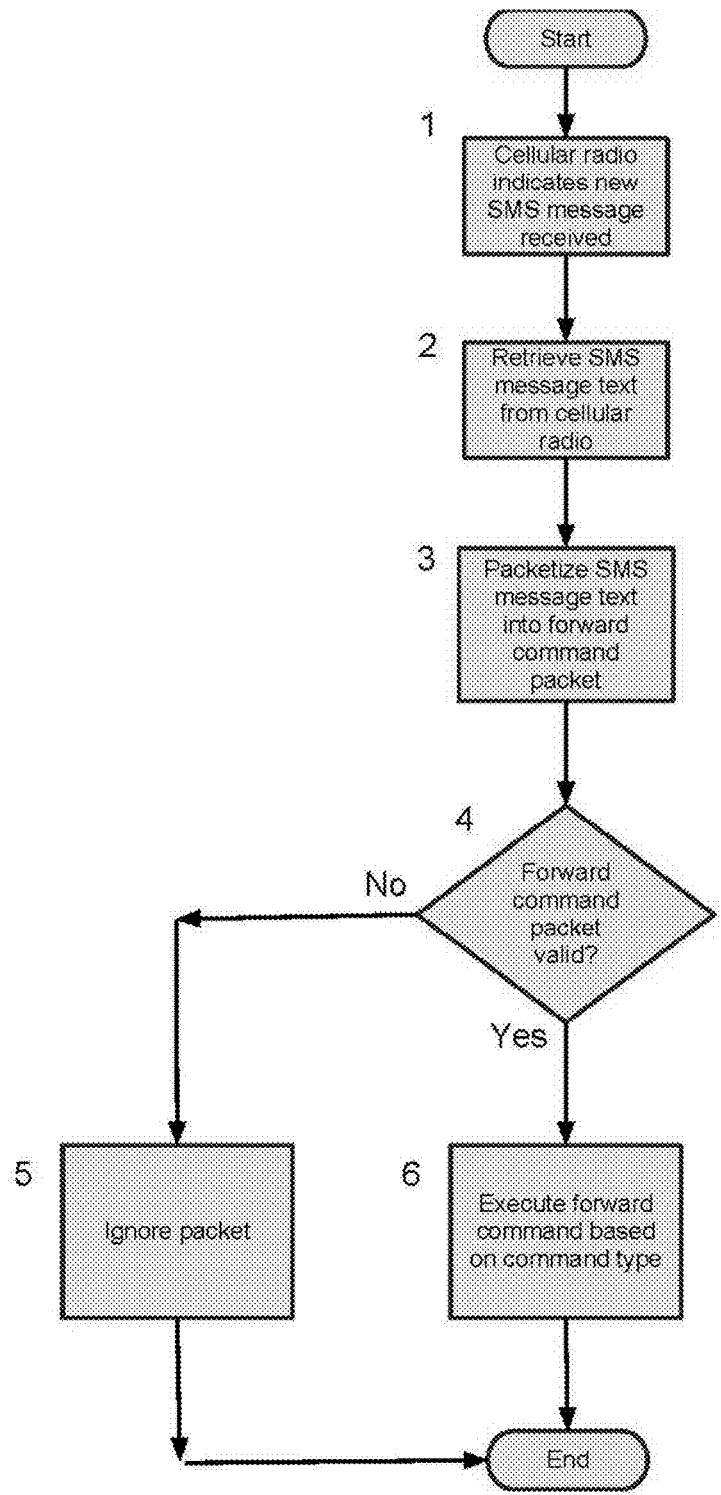
FIG. 20 is an operational flow diagram illustrating example operation of the EDC system with forward commands.

FIG. 20 is an operational block diagram illustrating example operation of the EDC system with forward commands. At block 1, the forward command is received and processed by the EDC system or programmable electronic device. In some embodiments, the cellular transceiver module indicates a received message by togging an output pin. The processor may monitor this pin for toggles. When the processor detects that the pin has been toggled, the processor may retrieve the message. At block 2 the processor may retrieve received messages from the cellular transceiver by issuing commands, such as ASCII commands via a UART. When the commands are executed, the cellular transceiver module can send the SMS message text to the processor. The processor may store the message text in memory, such as RAM for processing. At block 3, the message text can be packetized into a predetermined forward command packet structure. The packet structure may include information about the forward command and provide error detection provisions. The forward command packet structure may contain the command type. The command type can be used to determine what action to take when a forward command arrives.

It is determined if the forward command packet is a valid packet at block 4. In some embodiments, once the forward command packet is created, it can be validated by checking the total length and a checksum. At block 5, if the packet is not valid, it can be ignored by the processor. If the packet is valid, the forward command is executed by the processor at block 6. When a packet is ignored, no further processing takes place.

Conductivity Circuit

Figure 21:
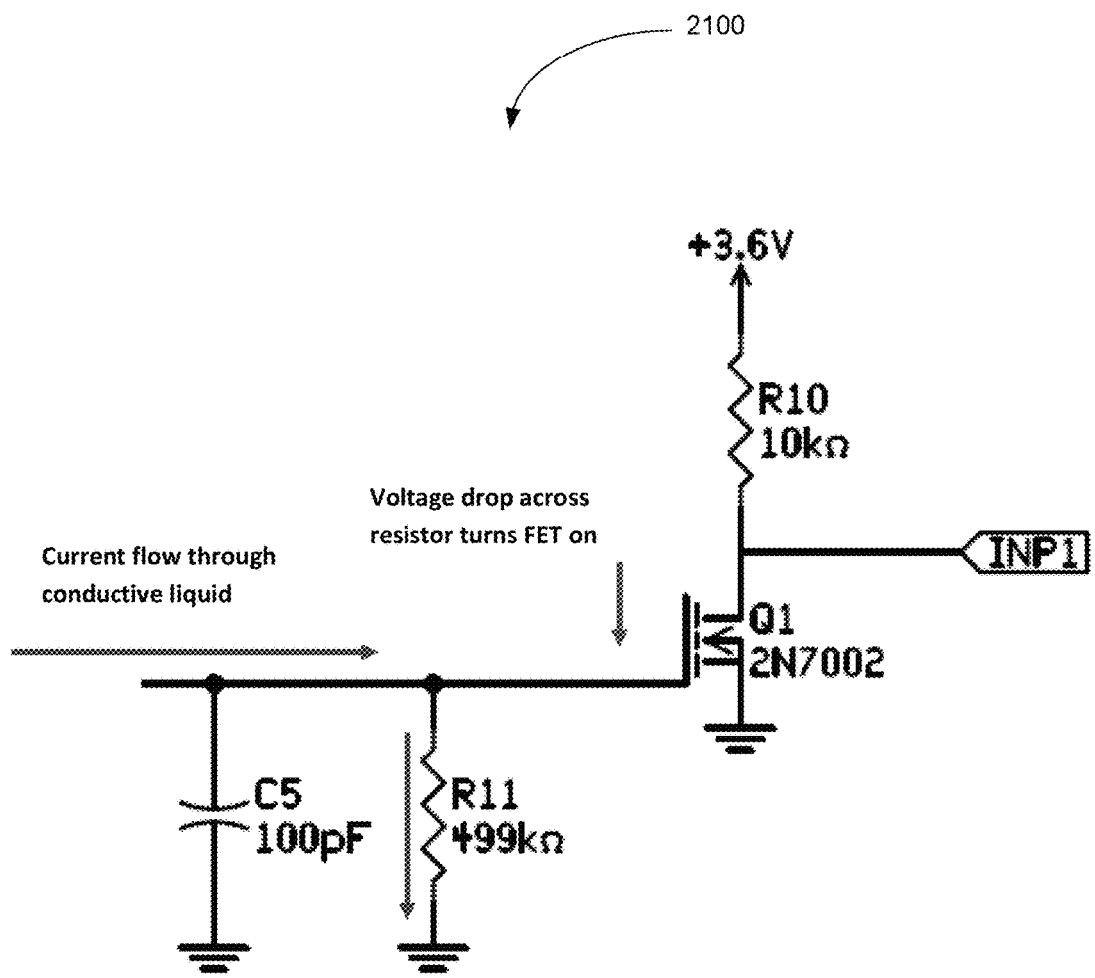
FIG. 21 is a circuit schematic of an example conductivity circuit that may be used with the EDC system.

In an embodiment, the EDC system may include a conductivity circuit. For example, when the EDC system is included in a liquid related application, such as a sump pump, the conductivity circuit may be used to detect the presence of liquid. FIG. 21 is a circuit schematic of an example conductivity circuit 2100. The conductive circuit 2100 utilizes a switch Q1, such as a logic-level N-channel FET, and includes a pull down resistor R11, a capacitor C5, and a transorb R10. Although example component values and power supply voltages are provided for the components illustrated, in other embodiments, other component values and power supply voltages may be used. During operation, when a voltage is applied via a conductive liquid, a current flows through the liquid and reaches a threshold level that creates a voltage drop across the pull-down resistor R11 at the gate of the switch Q1 that is large enough to turn the switch Q1 on. When the switch Q1 is turned on an input (INP1) received by the processor, such as via the I/O module, is pulled low. When the switch Q1 is turned off, the input to the processor is pulled high. The capacitor C5 placed across the gate of the switch Q1 to ground provides a debouncing function to reduce false alarms due to transients such as switching noise. The transorb R10 placed across the gate of the switch Q1 protects against voltage transients.

The conductivity sensing element design, may be formed by a flat wafer with two electrodes. The electrodes protrude out not only an end of the flat wafer, but also out both sides of the flat wafer, instead of protruding out only the end of the sensor body. The advantage of this design, is illustrated in the example of using the EDC system in a sump pump monitoring application. In this application, the same sensor can be either suspended into a well, or can be laid on a flat surface for monitoring surface runoff or floor leaks. For example, the sensor can be placed on a floor beneath a water heater, and if the water heater develops a leak, the water is detected by the flat probe. Having probe electrodes extending out the end, and sides, of the probe body is also advantageous in that the additional protruding electrode metal creates additional electrode surface area. This avoids fouling of the conductivity sensor electrodes from the buildup of dirt and debris on the electrodes, themselves, over time, since the additional surface area slows this process While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A programmable electronic device comprising:
    a processor;
        a cellular transceiver circuitry executable by the processor;
        a command interpreter circuitry executable by the processor and in communication with the cellular transceiver circuitry, the command interpreter circuitry configured to transmit to a mobile device and receive from a mobile device text messages as a first payload over a first communication channel via the cellular transceiver circuitry,
        the command interpreter circuitry further configured to program and configure operation of the programmable electronic device from commands and content identified by the command interpreter circuitry in the text messages, wherein the text messages are configuration text messages, and the processor is configured to only enable configuration of the programmable electronic device with the configuration text messages in response to the programmable electronic device being in a programming mode that is different from an operational mode, the configuration text message comprising an alarm threshold value, an output message for when the alarm threshold value is reached, or both; and
        an input/output circuitry executable by the processor for communication of a second payload with the mobile device over a second communication channel with a second communication protocol, the second communication channel being a different type of communication channel than the first communication channel, the second communication protocol being a different communication protocol than the first communication protocol, and the second payload being a larger payload than the first payload, wherein the processor is configured to program and configure operation of the programmable electronic device with the second payload.

2. The programmable electronic device of claim 1, further comprising a memory, wherein the text messages comprise a format from which the command interpreter circuitry is configured to identify a command comprising a character string as substantially matching a predetermined character string stored in the memory.

3. The programmable electronic device of claim 2, wherein the command interpreter circuitry is further configured to parse the format of the remainder of the text messages other than the character string to identify content corresponding to the identified command.

4. The programmable electronic device of claim 3, wherein a format of the text message is an unstructured format, and the command interpreter circuitry is further configured to sequentially parse the remainder of the unstructured format of the text messages and identify the content by selective identification of a group of characters having similar characteristics.

5. The programmable electronic device of claim 4, wherein the command interpretation circuitry is configured to ignore characters in the unstructured format having dissimilar characteristics from the group of characters having similar characteristics.

6. The programmable electronic device of claim 1, wherein the cellular transceiver circuitry comprises one of a first cellular transceiver for communication over a first wireless network, or a second cellular transceiver for communication over a second wireless network, the first wireless network being different from the second wireless network, and the processor is configured to dynamically determine that the first cellular transceiver or the second cellular transceiver is presently operable in the programmable electronic device, and automatically execute corresponding different communication related instructions that are compatible with the respective first cellular transceiver or the respective second cellular transceiver in accordance with whichever cellular transceiver is determined by the processor as being presently operable in the programmable electronic device.

7. The programmable electronic device of claim 1, further comprising a user interface having a multi-function input configured to initiate a test of the programmable electronic device in response to receipt of a momentary signal on the multi-function input, and configured to initiate the programming mode in response to receipt of a continuous signal longer than a predetermined duration on the multi-function input, wherein, responsive to the test of the programmable electronic device, the processor is configured to execute the cellular transceiver circuitry to transmit a text message indicative of an outcome of a self-diagnostic test to a phone number of a mobile device.

8. The programmable electronic device of claim 1, wherein the command interpreter circuitry is further configured to extract a parameter from the programmable electronic device in response to receipt of a text message requesting the parameter, and initiate transmission of the parameter in a response text message.

9. The programmable electronic device of claim 1, wherein the first communication protocol is a short message service communication protocol, and the second communication protocol is a short range wireless communication protocol.

10. The programmable electronic device of claim 1, wherein the input/output circuitry comprising a wireless communication circuitry executable by the processor to receive control signals, data signals or both control signals and data signals via the second communication protocol.

11. A programmable electronic device compromising:
    a processor configured to control a command interpreter circuitry, and at least one of a network adapter circuitry or a cellular transceiver circuitry;
    a field input/output circuitry in communication with the processor, the field input/output circuitry configured to process a plurality of inputs and outputs of the programmable electronic device, the field input/output circuitry executable by the processor to wirelessly communicate with a mobile device via a short range communication protocol to receive a first payload of data via the short range communication protocol, the data executable by the processor to program the programmable electronic device, or an external device, the external device programmable via the field input/output circuitry; and the command interpreter circuitry controlled by the processor to accept and execute text messages from the mobile device, the text messages in a short message service format received wirelessly by the cellular transceiver circuitry via the cellular network in a long range communication protocol having a range longer than the short range communication protocol, the command interpreter circuitry further controlled by the processor to use a second payload of the text messages to configure operation of the programmable electronic device or to configure operation of the external device via the field input/output circuitry, wherein the text messages are configuration text messages, and the processor is configured to only enable configuration of the programmable electronic device with the second payload in response to the programmable electronic device being in a programming mode that is different from an operational mode, the second payload comprising an alarm threshold value, an output message for when the alarm threshold value is reached, or both.

12. The programmable electronic device of claim 11, wherein the command interpreter circuitry is further configured to convert the text message to a predetermined protocol compatible with the external device and communicate the converted text message to the external device via the field input/output circuitry, or interpret the text message as being for the programmable electronic device.

13. The programmable electronic device of claim 12, wherein the predetermined protocol of the converted text message comprises instructions to at least one of control, configure or program the external device and the interpretation of the text message as being for the programmable electronic device comprises interpretation of the text message as instructions to control the programmable electronic device, to configure the programmable electronic device, to program the programmable electronic device, or some combination thereof.

14. The programmable electronic device of claim 11, wherein the text messages comprises a phone number configuration text message having a different second payload, the different second payload comprising a command and content, and the command interpreter circuitry is configured to parse the command from the text message to identify the message as the phone number configuration text message, and is further configured to parse the content to identify a phone number included in the message.

15. The programmable electronic device of claim 14, wherein, the content is unstructured content, and the command interpreter circuitry is further configured to sequentially parse the unstructured content to identify and create a plurality of groups of numeric values included in the unstructured content representative of the phone number, the numeric values randomly located in any of a plurality of different character locations.

16. The programmable electronic device of claim 14, further comprising a memory in communication with the processor, and wherein the command is representative of an identifier of a storage location in the memory for the phone number, and the processor is further configured to store the phone number in memory as a security authorization such that configuration commands received via text message are confirmed by the processor as being sent by an authorized user based on the stored phone number.

17. The programmable electronic device of claim 11, wherein the short message service format of the second payload and a format of the data received in the first payload via the short range communication protocol are different.

18. A method of configuring operation of a programmable electronic device, the method comprising:

receiving with a cellular transceiver module text messages transmitted over a first communication channel in a first communication protocol used for transmission of text messages including a first payload, wherein the text messages are configuration text messages and the first payload comprises an alarm threshold value, an output message for when the alarm threshold value is reached, or both;

confirming, with a processor, that the programmable electronic device is in a programming mode in response to receipt of the first payload, wherein configuration of the programmable electronic device is enabled only when the programmable electronic device is in the programming mode, the programming mode being different from an operational mode;

enabling, with the processor, configuration of the programmable device with the configuration text messages in response to the programmable electronic device being in the programming mode;

parsing the text message using a processor to identify a command included in a group of character locations at a beginning of the text message, the command corresponding to the alarm threshold value, the output message for when the alarm threshold value is reached, or both;

confirming, using the processor, that the command is valid;

identifying, using the processor, a next character location in the first payload of the text message at an end of the identified command;

sequentially parsing, using the processor, content of the first payload of the text message in the next character location and a plurality of character locations included in the text message after the next character location;

identifying characters in the plurality of character locations representing the alarm threshold value, the output message for when the alarm threshold value is reached, or both;

adjusting an operational configuration of the programmable electronic device, using the processor, based on execution of the identified command using the identified characters with similar characteristics;

receiving data wirelessly in a second payload via a second communication channel in a second communication protocol used for transmission of other than text messages received other than via the cellular transceiver; and programming or configuring operation of the programmable electronic device with the second payload.

19. The method of claim 18, wherein identifying the command further comprises the step of substantially matching a character string extracted from the group of character locations with a predetermined character string stored in a memory included in the programmable electronic device.

20. The method of claim 18, further comprising converting the text message to a format compatible with an external device based on the identified command using the identified characters, and transmitting the converted text message for receipt by the external device, the external device being separated away from the programmable electronic device.

* * * * *